United States Patent
Naik et al.

(10) Patent No.: US 12,047,873 B2
(45) Date of Patent: Jul. 23, 2024

(54) LOW LATENCY SOLUTIONS FOR RESTRICTED TARGET WAKE TIME (r-TWT) DURING MULTI-LINK OPERATION (MLO)

(71) Applicant: QUALCOMM Incorporated, San Diego, CA (US)

(72) Inventors: Gaurang Naik, San Diego, CA (US); Abdel Karim Ajami, San Diego, CA (US); Alfred Asterjadhi, San Diego, CA (US); George Cherian, San Diego, CA (US); Abhishek Pramod Patil, San Diego, CA (US); Sai Yiu Duncan Ho, San Diego, CA (US); Yanjun Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 17/560,203

(22) Filed: Dec. 22, 2021

(65) Prior Publication Data

US 2023/0199641 A1 Jun. 22, 2023

(51) Int. Cl.
*H04W 52/02* (2009.01)
*H04W 76/15* (2018.01)
*H04W 92/20* (2009.01)

(52) U.S. Cl.
CPC ....... *H04W 52/0206* (2013.01); *H04W 76/15* (2018.02); *H04W 92/20* (2013.01)

(58) Field of Classification Search
CPC .. H04W 52/0206; H04W 76/15; H04W 92/20
See application file for complete search history.

(56) References Cited

U.S. PATENT DOCUMENTS

2019/0239226 A1* 8/2019 Chu .................. H04L 5/001
2020/0374802 A1* 11/2020 Chu ................. H04W 52/0216
(Continued)

FOREIGN PATENT DOCUMENTS

| CN | 115395996 A | * | 11/2022 | ........... H04B 7/0602 |
| EP | 3820225 A1 | * | 5/2021 | |
| WO | WO-2023017340 A1 | * | 2/2023 | ........ H04W 52/0216 |

OTHER PUBLICATIONS

"35. Extremely High Throughput (EHT) MAC Specification", IEEE Draft, TGBE_CL_35, IEEE-SA, Piscataway, NJ USA, vol. 802. 11be drafts, No. D0.3, Jan. 19, 2021 (Jan. 19, 2021), pp. 125-152, XP068183504, [retrieved on Jan. 19, 2021] section 35.3.10.1, TGbe_C1_35.doc.

(Continued)

*Primary Examiner* — Parth Patel
(74) *Attorney, Agent, or Firm* — Holland & Hart / Qualcomm

(57) ABSTRACT

This disclosure provides systems, methods and apparatus, including computer programs encoded on computer storage media, for protecting latency-sensitive communications among multi-link devices (MLDs). An access point (AP) MLD may establish multiple communication links with a non-AP MLD and schedule a restricted target wake time (r-TWT) service period (SP) on one of the links (the "r-TWT link"). In some aspects, when a transmit opportunity (TXOP) acquired on a non-r-TWT link overlaps the r-TWT SP, the TXOP may be extended to support an exchange of latency-sensitive traffic on the non-r-TWT link. In some other aspects, any TXOPs occurring on non-r-TWT links may be terminated prior to the start of the r-TWT SP so that latency-sensitive traffic can be exchanged on the r-TWT link during the SP. An AP MLD also may schedule SPs on multiple communication links. In some aspects, the AP (Continued)

MLD may transfer a TWT agreement between the communication links.

30 Claims, 16 Drawing Sheets

(56) References Cited

U.S. PATENT DOCUMENTS

| | | | | |
|---|---|---|---|---|
| 2022/0029736 A1* | 1/2022 | Chu | ............... | H04L 1/0023 |
| 2022/0386372 A1* | 12/2022 | Xin | ............... | H04W 74/002 |
| 2022/0408355 A1* | 12/2022 | Shafin | ............... | H04W 24/08 |
| 2023/0026249 A1* | 1/2023 | Chu | ............... | H04W 52/0248 |
| 2023/0032665 A1* | 2/2023 | Wang | ............... | H04L 1/1861 |
| 2023/0047705 A1* | 2/2023 | Xin | ............... | H04W 74/0808 |
| 2023/0058871 A1* | 2/2023 | Xin | ............... | H04W 52/0258 |
| 2023/0073352 A1* | 3/2023 | Wei | ............... | H04W 52/0216 |
| 2023/0103061 A1* | 3/2023 | Shafin | ............... | H04W 52/0216 370/311 |
| 2023/0104446 A1* | 4/2023 | Ajami | ............... | H04W 84/12 370/329 |
| 2023/0126846 A1* | 4/2023 | Ratnam | ............... | H04W 76/15 370/311 |
| 2023/0130117 A1* | 4/2023 | Hu | ............... | H04W 52/0216 370/318 |
| 2023/0139168 A1* | 5/2023 | Xin | ............... | H04W 72/12 370/311 |
| 2023/0155768 A1* | 5/2023 | Schelstraete | ............... | H04L 5/0007 370/329 |
| 2023/0199641 A1* | 6/2023 | Naik | ............... | H04W 76/15 370/318 |
| 2023/0199647 A1* | 6/2023 | Xia | ............... | H04W 52/0216 370/311 |
| 2023/0199847 A1* | 6/2023 | Xin | ............... | H04W 74/0816 370/329 |
| 2023/0345366 A1* | 10/2023 | Shafin | ............... | H04W 52/0216 |
| 2023/0345535 A1* | 10/2023 | Kim | ............... | H04L 1/1614 |

OTHER PUBLICATIONS

Chu L., et al., "Low Latency Support", IEEE Draft, 11-20-1058-01-00BE-Low-Latency-Support, IEEE-SA Mentor, Piscataway, NJ USA, vol. 802.11 EHT, 802.11be, No. 1, Oct. 14, 2020 (Oct. 14, 2020), pp. 1-10, 2020-09-02, XP068173794, [retrieved on Oct. 14, 2020] the whole document.

Handte T., et al., "Primary and Secondary User in R-TWT", IEEE Draft, 11-21-1656-00-00BE-Primary-And-Secondary-User-IN-R-TWT, IEEE-SA Mentor, Piscataway, NJ USA, vol. 802.11 EHT, 802.11be, Oct. 8, 2021 (Oct. 8, 2021), pp. 1-15, XP068185296, [retrieved on Oct. 8, 2021] slides 5 to 7.

International Search Report and Written Opinion—PCT/US2022/079069—ISA/EPO—Feb. 1, 2023 (2201392WO).

Yang B.B., et al., "Discussion on Low Latency Traffic", IEEE Draft, 11-20-1852-02-00BE-Discussion-on-Low-Latency-Traffic, IEEE-SA Mentor, Piscataway, NJ USA, vol. 802.11 EHT, 802.11be, No. 2, Feb. 24, 2021 (Feb. 24, 2021), pp. 1-14, Nov. 2, 2020, XP068178846, [retrieved on Feb. 24, 2021] slide 7.

* cited by examiner

LOW LATENCY SOLUTIONS FOR RESTRICTED TARGET WAKE TIME (r-TWT) DURING MULTI-LINK OPERATION (MLO)

TECHNICAL FIELD

This disclosure relates generally to wireless communication, and more specifically, to low latency solutions for restricted target wake time (r-TWT) during multi-link operation (MLO).

DESCRIPTION OF THE RELATED TECHNOLOGY

A wireless local area network (WLAN) may be formed by one or more access points (APs) that provide a shared wireless medium for use by a number of client devices or stations (STAs). Each AP, which may correspond to a Basic Service Set (BSS), may periodically broadcast beacon frames to enable any STAs within wireless range of the AP to establish and maintain a communication link with the WLAN. WLANs that operate in accordance with the IEEE 802.11 family of standards are commonly referred to as Wi-Fi networks.

Some wireless communication devices may be associated with low-latency applications having strict end-to-end latency, throughput, and timing requirements for data traffic. Example low-latency applications include, but are not limited to, real-time gaming applications, video communications, and augmented reality (AR) and virtual reality (VR) applications (collectively referred to as extended reality (XR) applications). Such low-latency applications may specify various latency, throughput, and timing requirements for wireless communication systems that provide connectivity for these applications. Thus, it is desirable to ensure that WLANs are able to meet the various latency, throughput, and timing requirements of such low-latency applications.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method can be performed by a wireless communication device to exchange latency-sensitive data traffic with an access point (AP) multi-link device (MLD). In some implementations, the method can include establishing a plurality of communication links with an AP MLD; communicating with the AP MLD on a first communication link of the plurality of communication links, where the communication is associated with a transmit opportunity (TXOP); terminating the communication on the first communication link at a first time associated with a restricted target wake time (r-TWT) service period (SP) associated with a second communication link of the plurality of communication links.

In some aspects, the first time may occur after the start of the r-TWT SP and the data may be exchanged on the first communication link during the TXOP. In some other aspects, the first time may occur prior to the start of the r-TWT SP and the data may be exchanged on the second communication link during the r-TWT SP. In some aspects, the terminating of the communication on the first communication link may include transmitting, on the first communication link, power management information indicating that a STA associated with the first communication link is entering a power save mode.

Another innovative aspect of the subject matter described in this disclosure can be implemented in a wireless communication device. The wireless communication device can include a processing system and an interface configured to establish a plurality of communication links with an AP MLD; communicate with the AP MLD on a first communication link of the plurality of communication links, where the communication is associated with a TXOP; terminate the communication on the first communication link at a first time associated with an r-TWT SP associated with a second communication link of the plurality of communication links; and exchange data with the AP MLD during a period associated with the r-TWT SP.

In some aspects, the first time may occur after the start of the r-TWT SP and the data may be exchanged on the first communication link during the TXOP. In some other aspects, the first time may occur prior to the start of the r-TWT SP and the data may be exchanged on the second communication link during the r-TWT SP. In some aspects, the terminating of the communication on the first communication link may include transmitting, on the first communication link, power management information indicating that a STA associated with the first communication link is entering a power save mode.

Another innovative aspect of the subject matter described in this disclosure can be implemented as a method of wireless communication. The method can be performed by a wireless communication device to schedule target wake time (TWT) SPs on multiple communication links with a non-AP MLD. In some implementations, the method can include establishing a plurality of communication links with a non-AP MLD; transmitting first TWT information indicating a first TWT SP associated with a first communication link of the plurality of communication links; and transmitting second TWT information indicating a second TWT SP associated with a second communication link of the plurality of communication links.

In some aspects, the first TWT SP and the second TWT SP may be orthogonal in time. In some other aspects, the first TWT SP may at least partially overlap the second TWT SP in time. In some other aspects, the second TWT information may be associated with a transfer of a TWT agreement from the first communication link to the second communication link.

Another innovative aspect of the subject matter described in this disclosure can be implemented in a wireless communication device. The wireless communication device can include a processing system and an interface configured to establish a plurality of communication links with a non-AP MLD; transmit first TWT information indicating a first TWT SP associated with a first communication link of the plurality of communication links; and transmit second TWT information indicating a second TWT SP associated with a second communication link of the plurality of communication links.

In some aspects, the first TWT SP and the second TWT SP may be orthogonal in time. In some other aspects, the first TWT SP may at least partially overlap the second TWT SP in time. In some other aspects, the second TWT information may be associated with a transfer of a TWT agreement from the first communication link to the second communication link.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
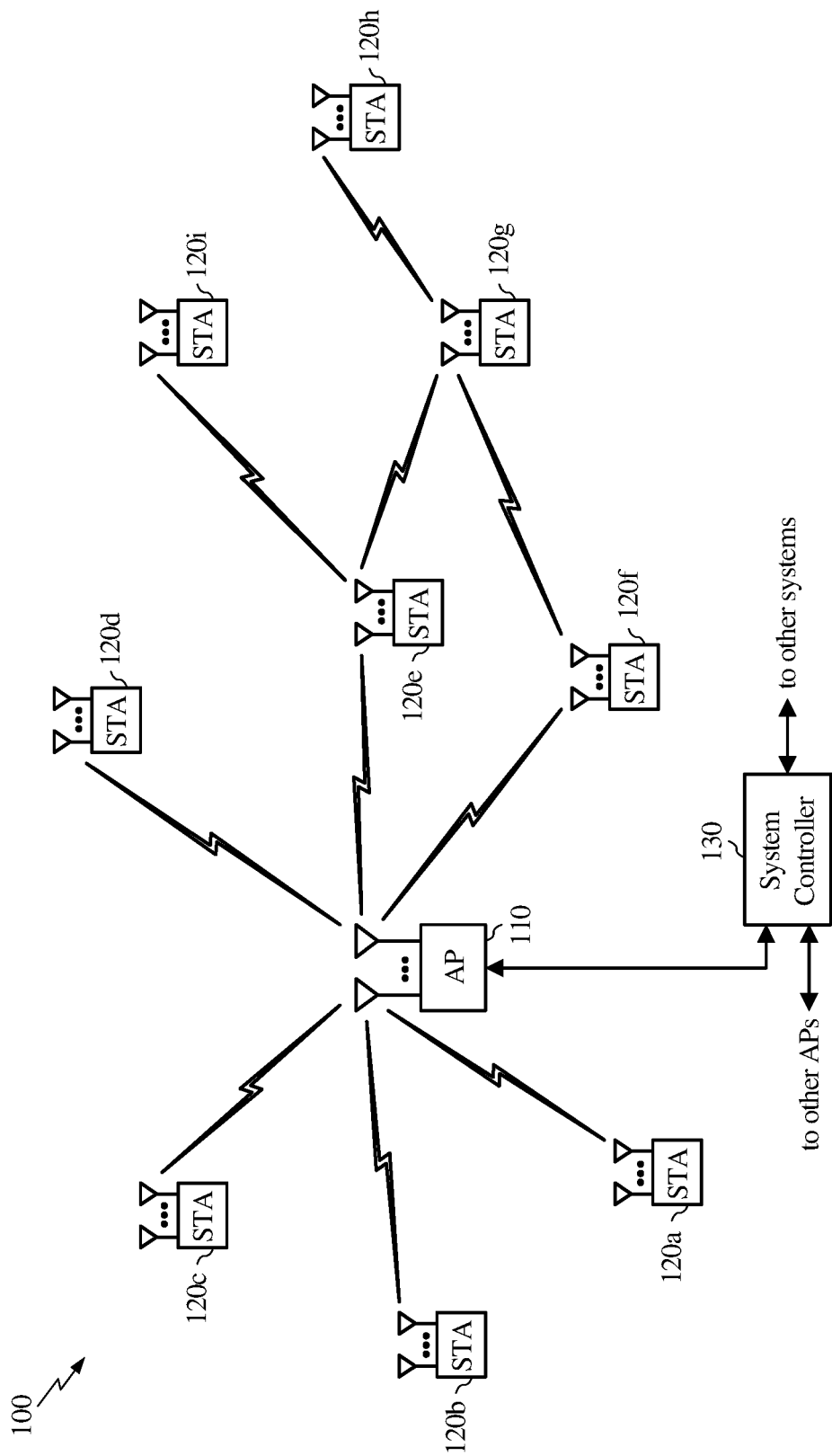
FIG. 1 shows a block diagram of an example wireless system.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

The IEEE 802.11be amendment of the IEEE 802.11 standard describes a restricted target wake time (r-TWT) service period (SP) that can be allocated for latency-sensitive traffic. As used herein, the term "non-legacy STA" refers to any wireless station (STA) that supports the IEEE 802.11be amendment, or future generations, of the IEEE 802.11 standard, while the term "low-latency STA" refers to any non-legacy STA that has latency-sensitive traffic to send or receive. In contrast, the term "legacy STA" may refer to any STA that only supports the IEEE 802.11ax, or earlier generations, of the IEEE 802.11 standard. Non-legacy STAs that support r-TWT operation and acquire transmit opportunities (TXOPs) outside of an r-TWT SP must terminate their respective TXOPs before the start of any r-TWT SP for which they are not a member. Further, an AP may suppress traffic from all legacy STAs during an r-TWT SP by scheduling a quiet interval to overlap with the r-TWT SP. As such, r-TWT SPs can provide more predictable latency, reduced worst case latency, or reduced jitter, with higher reliability for latency-sensitive traffic.

Some wireless communication devices may be capable of multi-link operation (MLO). An MLO-capable device may be referred to as a multi-link device (MLD). For example, an access point (AP) MLD may include multiple APs each configured to communicate on a respective communication link with a non-AP MLD (also referred to as a "STA MLD"). Similarly, the non-AP MLD may include multiple STAs each configured to communicate on a respective one of the communication links with the AP MLD. Some non-AP MLDs may communicate with the AP MLD concurrently on each of the communication links, for example, in accordance with a multi-link multi-radio (MLMR) simultaneous transmit and receive (STR) or MLMR non-STR (NSTR) mode of operation. On the other hand, some non-AP MLDs may communicate with the AP MLD on only one of the communication links at any given time, for example, in accordance with a multi-link single-radio (MLSR) or enhanced MLSR (EMLSR) mode of operation. Still further, some non-AP MLDs may communicate with the AP MLD on a subset (such as two or more) of the communication links at any given time, for example, in accordance with an enhanced MLMR (EMLMR) or hybrid EMLSR mode of operation. Accordingly, new communication protocols or mechanisms are needed to extend r-TWT support to MLO.

Implementations of the subject matter described in this disclosure may be used to protect latency-sensitive communications in MLO architectures and to support SP scheduling on multiple communication links. In some aspects, an AP MLD may establish multiple communication links with a non-AP MLD but may schedule an r-TWT SP on only one of the links (referred to herein as an "r-TWT link"). In some implementations, the non-AP MLD may not support concurrent and asynchronous operation on multiple communication links. For example, the non-AP MLD may operate in accordance with any of the MLSR, EMLSR, MLMR NSTR, or EMLMR modes of non-AP MLD operation. As such, the non-AP MLD (or the AP MLD) may ensure that communications (including transmissions of uplink data or reception of downlink data) on any of the communication links other than the r-TWT link (also referred to herein as "non-r-TWT links") do not interfere with latency-sensitive traffic scheduled for transmission or reception during the r-TWT SP. In some implementations, when a TXOP acquired on a non-r-TWT link overlaps the r-TWT SP, the TXOP holder may extend the TXOP to support an exchange of latency-sensitive traffic on the non-r-TWT link during a period associated (or coinciding) with the r-TWT SP. In some other implementations, the AP MLD or the non-AP MLD may terminate uplink or downlink TXOPs on any non-r-TWT links prior to the start of the r-TWT SP so that latency-sensitive traffic can be exchanged on the r-TWT link during the r-TWT SP.

In some other aspects, an AP MLD may establish multiple communication links with a non-AP MLD and may schedule SPs (such as r-TWT SPs, individual TWT SPs, or broadcast TWT SPs) on two or more of the links. In some implementations, the SPs associated with (or scheduled on) different communication links may be orthogonal in time (or non-overlapping). In some other implementations, the SPs scheduled on different communication links may at least partially overlap in time. In some implementations, the non-AP MLD may not support concurrent operation on multiple communication links. For example, the non-AP MLD may operate in accordance with any of the MLSR, EMLSR, or EMLMR modes of non-AP MLD operation. In such implementations, the AP MLD may schedule overlapping SPs that are announced (where the non-AP MLD must explicitly announce its availability on a given link). In some other implementations, the non-AP MLD may support concurrent operations on multiple communication links (such as in accordance with the MLMR NSTR or MLMR STR mode of non-AP MLD operation). In such implementations, the AP MLD may schedule overlapping SPs and may trigger concurrent uplink or downlink transmissions on multiple communication links during the overlapping SPs.

Still further, in some aspects, an AP MLD may transfer a TWT agreement associated with one or more SPs (also referred to herein as a "TWT session") between multiple communication links. In some implementations, the transfer of the TWT agreement may be initiated (unsolicited) by the AP MLD. In some other implementations, the transfer of the TWT agreement may be requested by the non-AP MLD. In some implementations, the AP MLD or the non-AP MLD may transmit TWT transfer information on the first communication link signaling that the TWT agreement associated with the first communication link is to be transferred to another communication link. In such implementations, the TWT transfer information may indicate that the second communication link is the destination for the transfer. In some other implementations, the AP MLD or the non-AP MLD may transmit TWT transfer information on the second communication link signaling that a TWT session is to be set up on the second communication link. In such implementations, the TWT transfer information may indicate that the TWT session is transferred from the first communication link (rather than a new TWT session).

Particular implementations of the subject matter described in this disclosure can be implemented to realize one or more of the following potential advantages. By extending the TXOP acquired on a non-r-TWT link to accommodate an exchange of latency-sensitive traffic, aspects of the present disclosure may allow non-AP MLDs that do not support concurrent and asynchronous operation on multiple communication links to satisfy the latency requirements associated with the latency-sensitive traffic without interrupting or compromising communications on the non-r-TWT link. However, aspects of the present disclosure recognize that a TXOP may not be extended when it is allocated by an AP MLD for a trigger-based uplink transmission, and latency-sensitive traffic may not be transmitted on a non-r-TWT link when a traffic identifier (TID) associated with the latency-sensitive data is not mapped to the non-r-TWT link. By terminating any TXOPs on non-r-TWT links prior to the start of an r-TWT SP, aspects of the present disclosure may allow non-AP MLDs that do not support concurrent and asynchronous operation on multiple communication links to satisfy the latency requirements associated with their latency-sensitive traffic, regardless of the circumstances on the non-r-TWT links.

Further, by scheduling SPs on multiple communication links associated with an MLO architecture, aspects of the present disclosure may further improve the latency gains achievable by latency-sensitive traffic through application of r-TWT SPs. For example, non-overlapping SPs may provide latency gains across multiple links by increasing the frequency with which an AP MLD or non-AP MLD can transmit latency-sensitive traffic. On the other hand, overlapping SPs may provide greater power savings by allowing an AP MLD or non-AP MLD to turn off its modem circuitry (including all wireless radios) for longer durations. Partially-overlapping SPs may balance the benefits of overlapping SPs (such as reduced power consumption) with the benefits of non-overlapping SPs (such as reduced latency). Still further, by transferring a TWT agreement between communication links, aspects of the present disclosure may allow individual communication links to be seamlessly deleted or suspended. For example, an AP MLD or non-AP MLD may transfer a TWT agreement from a first communication link to a second communication link prior to deleting or suspending the first communication link, thereby allowing latency-sensitive traffic to continue with little or no delay on the second communication link.

FIG. 1 shows a block diagram of an example wireless system 100. The wireless system 100 is shown to include a wireless access point (AP) 110 and a number of wireless stations (STAs) 120a-120i. For simplicity, one AP 110 is shown in FIG. 1. The AP 110 may form a wireless local area network (WLAN) that allows the AP 110, the STAs 120a-120i, and other wireless devices (not shown for simplicity) to communicate with each other over a wireless medium. The wireless medium, which may be divided into a number of channels or into a number of resource units (RUs), may facilitate wireless communications between the AP 110, the STAs 120a-120i, and other wireless devices connected to the WLAN. In some implementations, the STAs 120a-120i can communicate with each other using peer-to-peer communications (such as without the presence or involvement of the AP 110). The AP 110 may be assigned a unique MAC address that is programmed therein by, for example, the manufacturer of the access point. Similarly, each of the STAs 120a-120i also may be assigned a unique MAC address.

In some implementations, the wireless system 100 may correspond to a multiple-input multiple-output (MIMO) wireless network and may support single-user MIMO (SU- MIMO) and multi-user (MU-MIMO) communications. In some implementations, the wireless system 100 may support orthogonal frequency-division multiple access (OFDMA) communications. Further, although the WLAN is depicted in FIG. 1 as an infrastructure Basic Service Set (BSS), in some other implementations, the WLAN may be an Independent Basic Service Set (IBSS), an Extended Service Set (ESS), an ad-hoc network, or a peer-to-peer (P2P) network (such as operating according to one or more Wi-Fi Direct protocols).

The STAs 120a-120i may be any suitable Wi-Fi enabled wireless devices including, for example, cell phones, personal digital assistants (PDAs), tablet devices, laptop computers, or the like. The STAs 120a-120i also may be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The AP 110 may be any suitable device that allows one or more wireless devices (such as the STAs 120a-120i) to connect to another network (such as a local area network (LAN), wide area network (WAN), metropolitan area network (MAN), or the Internet). In some implementations, a system controller 130 may facilitate communications between the AP 110 and other networks or systems. In some implementations, the system controller 130 may facilitate communications between the AP 110 and one or more other APs (not shown for simplicity) that may be associated with other wireless networks. In addition, or in the alternative, the AP 110 may exchange signals and information with one or more other APs using wireless communications.

The AP 110 may periodically broadcast beacon frames to enable the STAs 120a-120i and other wireless devices within wireless range of the AP 110 to establish and maintain a communication link with the AP 110. The beacon frames, which may indicate downlink (DL) data transmissions to the STAs 120a-120i and solicit or schedule uplink (UL) data transmissions from the STAs 120a-120i, are typically broadcast according to a target beacon transmission time (TBTT) schedule. The broadcasted beacon frames may include a timing synchronization function (TSF) value of the AP 110. The STAs 120a-120i may synchronize their own local TSF values with the broadcasted TSF value, for example, so that all of the STAs 120a-120i are synchronized with each other and with the AP 110.

In some implementations, each of the stations STAs 120a-120i and the AP 110 may include one or more transceivers, one or more processing resources (such as processors or Application-Specific Integrated Circuits (ASICs)), one or more memory resources, and a power source (such as a battery). The one or more transceivers may include Wi-Fi transceivers, Bluetooth transceivers, cellular transceivers, or other suitable radio frequency (RF) transceivers (not shown for simplicity) to transmit and receive wireless communication signals. In some implementations, each transceiver may communicate with other wireless devices in distinct frequency bands or using distinct communication protocols. The memory resources may include a non-transitory computer-readable medium (such as one or more nonvolatile memory elements, such as EPROM, EEPROM, Flash memory, a hard drive, etc.) that stores instructions for performing one or more operations described with respect to FIGS. 5-11.

Figure 2:
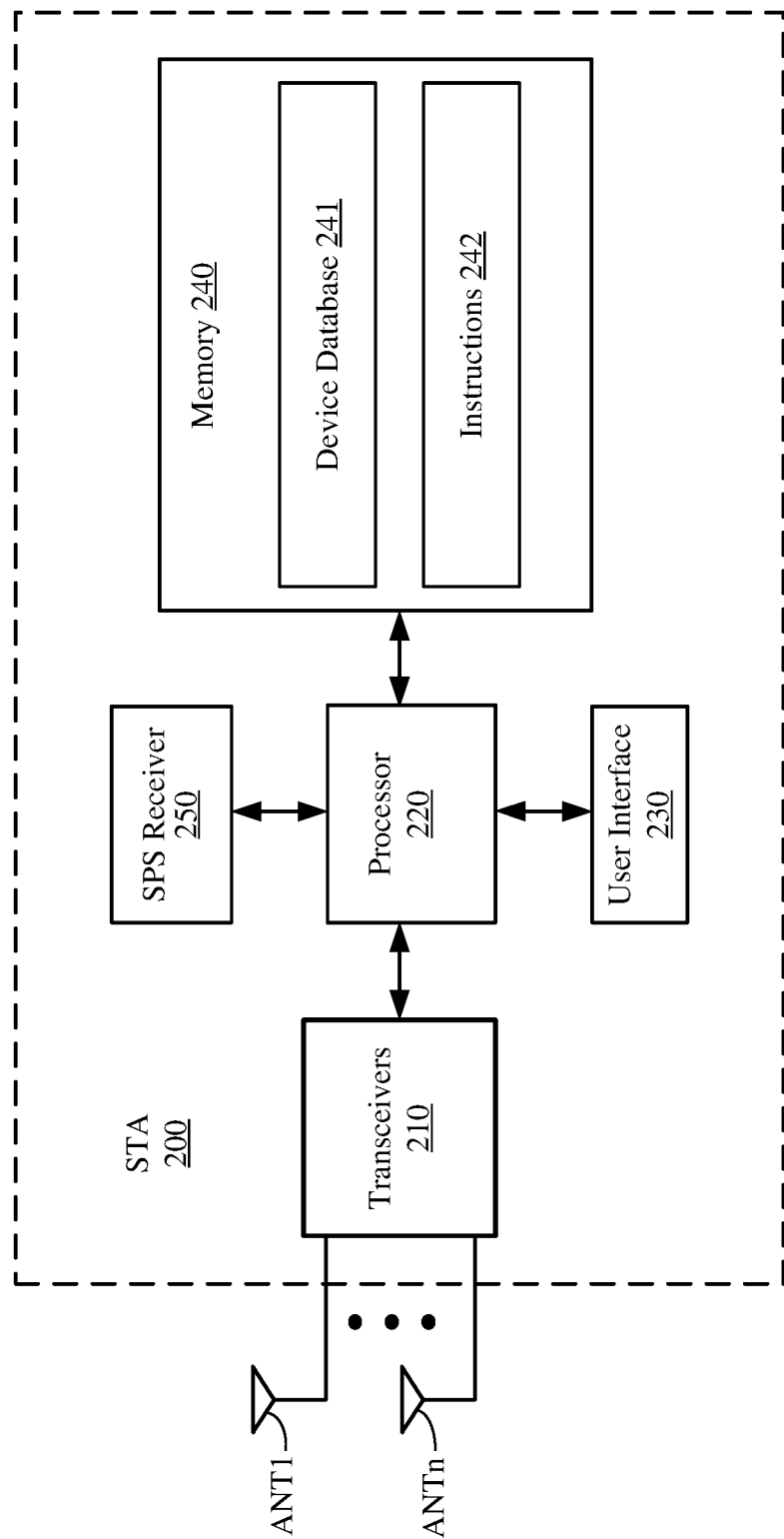
FIG. 2 shows a block diagram of an example wireless station (STA).

FIG. 2 shows an example wireless station (STA) 200. The STA 200 may be one implementation of at least one of the STAs 120a-120i of FIG. 1. The STA 200 may include one or more transceivers 210, a processor 220, a user interface 230, a memory 240, and a number of antennas ANT1-ANTn. The transceivers 210 may be coupled to antennas ANT1-ANTn, either directly or through an antenna selection circuit (not shown for simplicity). The transceivers 210 may be used to transmit signals to and receive signals from other wireless devices including, for example, a number of APs and a number of other STAs. Although not shown in FIG. 2 for simplicity, the transceivers 210 may include any number of transmit chains to process and transmit signals to other wireless devices via antennas ANT1-ANTn, and may include any number of receive chains to process signals received from antennas ANT1-ANTn. Thus, the STA 200 may be configured for MIMO communications and OFDMA communications. The MIMO communications may include SU-MIMO communications and MU-MIMO communications. In some implementations, the STA 200 may use multiple antennas ANT1-ANTn to provide antenna diversity. Antenna diversity may include polarization diversity, pattern diversity, and spatial diversity.

The processor 220 may be any suitable one or more processors capable of executing scripts or instructions of one or more software programs stored in the STA 200 (such as within the memory 240). In some implementations, the processor 220 may be or include one or more microprocessors providing the processor functionality and external memory providing at least a portion of machine-readable media. In other implementations, the processor 220 may be or include an Application Specific Integrated Circuit (ASIC) with the processor, the bus interface, the user interface, and at least a portion of the machine-readable media integrated into a single chip. In some other implementations, the processor 220 may be or include one or more Field Programmable Gate Arrays (FPGAs) or Programmable Logic Devices (PLDs).

In some implementations, the processor 220 may be a component of a processing system. A processing system may generally refer to a system or series of machines or components that receives inputs and processes the inputs to produce a set of outputs (which may be passed to other systems or components of, for example, the STA 200). For example, a processing system of the STA 200 may refer to a system including the various other components or sub-components of the STA 200.

The processing system of the STA 200 may interface with other components of the STA 200, and may process information received from other components (such as inputs or signals), output information to other components, and the like. For example, a chip or modem of the STA 200 may be coupled to or include a processing system, a first interface to output information, and a second interface to obtain information. In some instances, the first interface may refer to an interface between the processing system of the chip or modem and a transmitter, such that the STA 200 may transmit information output from the chip or modem. In some instances, the second interface may refer to an interface between the processing system of the chip or modem and a receiver, such that the STA 200 may obtain information or signal inputs, and the information may be passed to the processing system. A person having ordinary skill in the art will readily recognize that the first interface also may obtain information or signal inputs, and the second interface also may output information or signal outputs.

The user interface 230, which is coupled to the processor 220, may be or represent a number of suitable user input devices such as, for example, a speaker, a microphone, a display device, a keyboard, a touch screen, and so on. In some implementations, the user interface 230 may allow a user to control a number of operations of the STA 200, to interact with one or more applications executable by the STA 200, and other suitable functions.

In some implementations, the STA 200 may include a satellite positioning system (SPS) receiver 250. The SPS receiver 250, which is coupled to the processor 220, may be used to acquire and receive signals transmitted from one or more satellites or satellite systems via an antenna (not shown for simplicity). Signals received by the SPS receiver 250 may be used to determine (or at least assist with the determination of) a location of the STA 200.

The memory 240 may include a device database 241 that may store location data, configuration information, data rates, a medium access control (MAC) address, timing information, modulation and coding schemes (MCSs), traffic indication (TID) queue sizes, ranging capabilities, and other suitable information about (or pertaining to) the STA 200. The device database 241 also may store profile information for a number of other wireless devices. The profile information for a given wireless device may include, for example, a service set identification (SSID) for the wireless device, a Basic Service Set Identifier (BSSID), operating channels, TSF values, beacon intervals, ranging schedules, channel state information (CSI), received signal strength indicator (RSSI) values, goodput values, and connection history with the STA 200. In some implementations, the profile information for a given wireless device also may include clock offset values, carrier frequency offset values, and ranging capabilities.

The memory 240 also may be or include a non-transitory computer-readable storage medium (such as one or more nonvolatile memory elements, such as EPROM, EEPROM, Flash memory, a hard drive, and so on) that may store computer-executable instructions 242 to perform all or a portion of one or more operations described in this disclosure.

Figure 3:
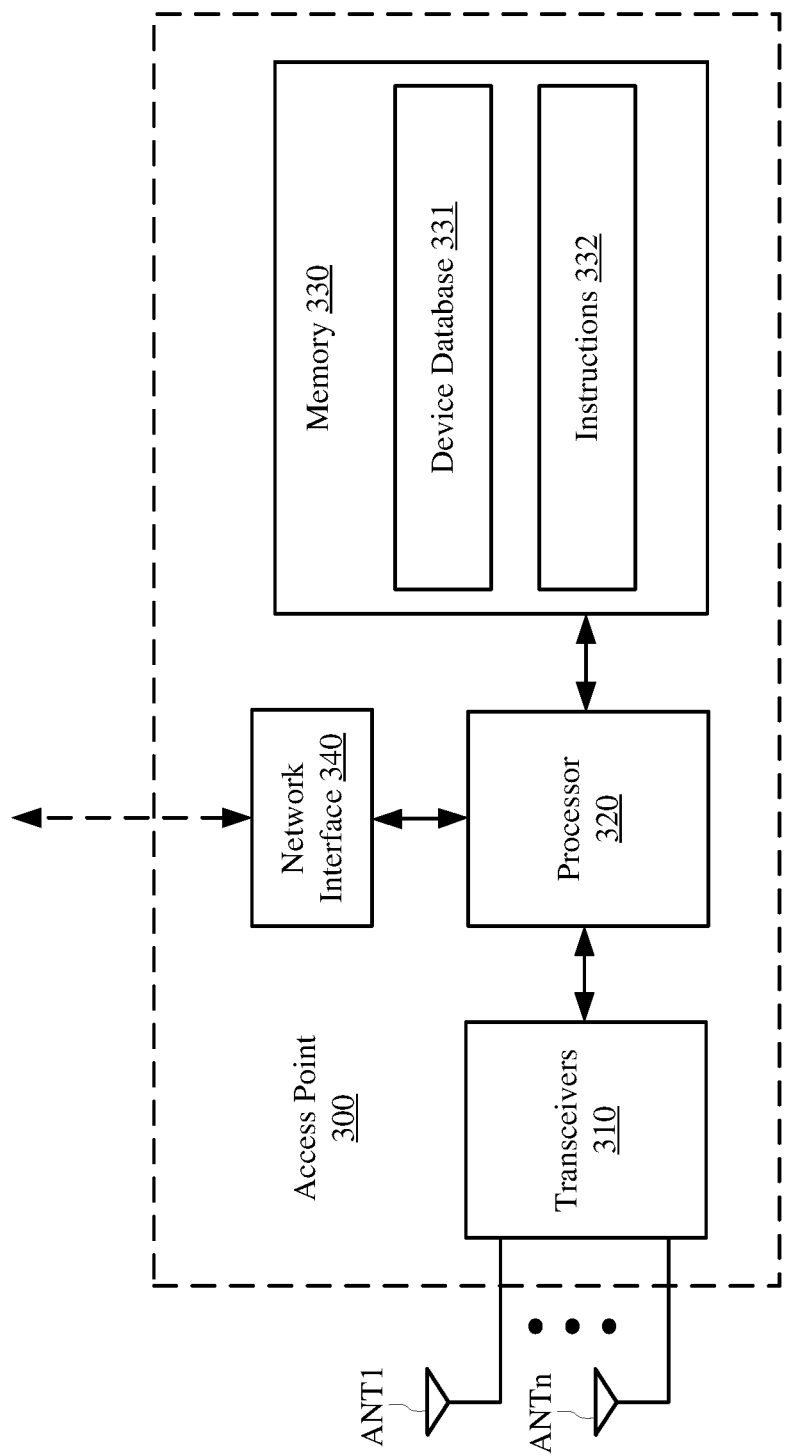
FIG. 3 shows a block diagram of an example access point (AP).

FIG. 3 shows an example access point (AP) 300. The AP 300 may be one implementation of the AP 110 of FIG. 1. The AP 300 may include one or more transceivers 310, a processor 320, a memory 330, a network interface 340, and a number of antennas ANT1-ANTn. The transceivers 310 may be coupled to the antennas ANT1-ANTn, either directly or through an antenna selection circuit (not shown for simplicity). The transceivers 310 may be used to transmit signals to and receive signals from other wireless devices including, for example, one or more of the STAs 120a-120i of FIG. 1 and other APs. Although not shown in FIG. 3 for simplicity, the transceivers 310 may include any number of transmit chains to process and transmit signals to other wireless devices via the antennas ANT1-ANTn, and may include any number of receive chains to process signals received from the antennas ANT1-ANTn. Thus, the AP 300 may be configured for MIMO communications and OFDMA communications. The MIMO communications may include SU-MIMO communications and MU-MIMO communications. In some implementations, the AP 300 may use multiple antennas ANT1-ANTn to provide antenna diversity. Antenna diversity may include polarization diversity, pattern diversity, and spatial diversity.

In high frequency (such as 60 GHz or millimeter wave (mmWave)) wireless communication systems (such as conforming to the IEEE 802.11ad or 802.11ay amendments of the IEEE 802.11 standard), communications may be beamformed using phased array antennas at the transmitter and the receiver. Beamforming generally refers to a wireless communication technique by which the transmitting device and the receiving device adjust transmit or receive antenna settings to achieve a desired link budget for subsequent communications. The procedure to adapt the transmit and receive antennas, referred to as beamforming training, may be performed initially to establish a link between the transmitting and receiving devices and also may be performed periodically to maintain a quality link using optimized transmit and receive beams.

The processor 320 may be any suitable one or more processors capable of executing scripts or instructions of one or more software programs stored in the AP 300 (such as within the memory 330). In some implementations, the processor 320 may be or include one or more microprocessors providing the processor functionality and external memory providing at least a portion of machine-readable media. In other implementations, the processor 320 may be or include an ASIC with the processor, the bus interface, the user interface, and at least a portion of the machine-readable media integrated into a single chip. In some other implementations, the processor 320 may be or include one or more FPGAs or PLDs. In some implementations, the processor 320 may be a component of a processing system. For example, a processing system of the AP 300 may refer to a system including the various other components or subcomponents of the AP 300.

The processing system of the AP 300 may interface with other components of the AP 300, and may process information received from other components (such as inputs or signals), output information to other components, and the like. For example, a chip or modem of the AP 300 may include a processing system, a first interface to output information, and a second interface to obtain information. In some instances, the first interface may refer to an interface between the processing system of the chip or modem and a transmitter, such that the AP 300 may transmit information output from the chip or modem. In some instances, the second interface may refer to an interface between the processing system of the chip or modem and a receiver, such that the AP 300 may obtain information or signal inputs, and the information may be passed to the processing system. A person having ordinary skill in the art will readily recognize that the first interface also may obtain information or signal inputs, and the second interface also may output information or signal outputs.

The network interface 340, which is coupled to the processor 320, may be used to communicate with the system controller 130 of FIG. 1. The network interface 340 also may allow the AP 300 to communicate, either directly or via one or more intervening networks, with other wireless systems, with other APs, with one or more back-haul networks, or any combination thereof.

The memory 330 may include a device database 331 that may store location data, configuration information, data rates, the MAC address, timing information, MCSs, ranging capabilities, and other suitable information about (or pertaining to) the AP 300. The device database 331 also may store profile information for a number of other wireless devices (such as one or more of the stations 120a-120i of FIG. 1). The profile information for a given wireless device may include, for example, an SSID for the wireless device, a BSSID, operating channels, CSI, received signal strength indicator (RSSI) values, goodput values, and connection history with the AP 300. In some implementations, the profile information for a given wireless device also may include TID queue sizes, a preferred packet duration for trigger-based UL transmissions, and a maximum amount of queued UL data that the wireless device is able to insert into TB PPBUs.

The memory 330 also may be or include a non-transitory computer-readable storage medium (such as one or more nonvolatile memory elements, such as EPROM, EEPROM, Flash memory, a hard drive, and so on) that may store computer-executable instructions 332 to perform all or a portion of one or more operations described in this disclosure.

Figure 4:
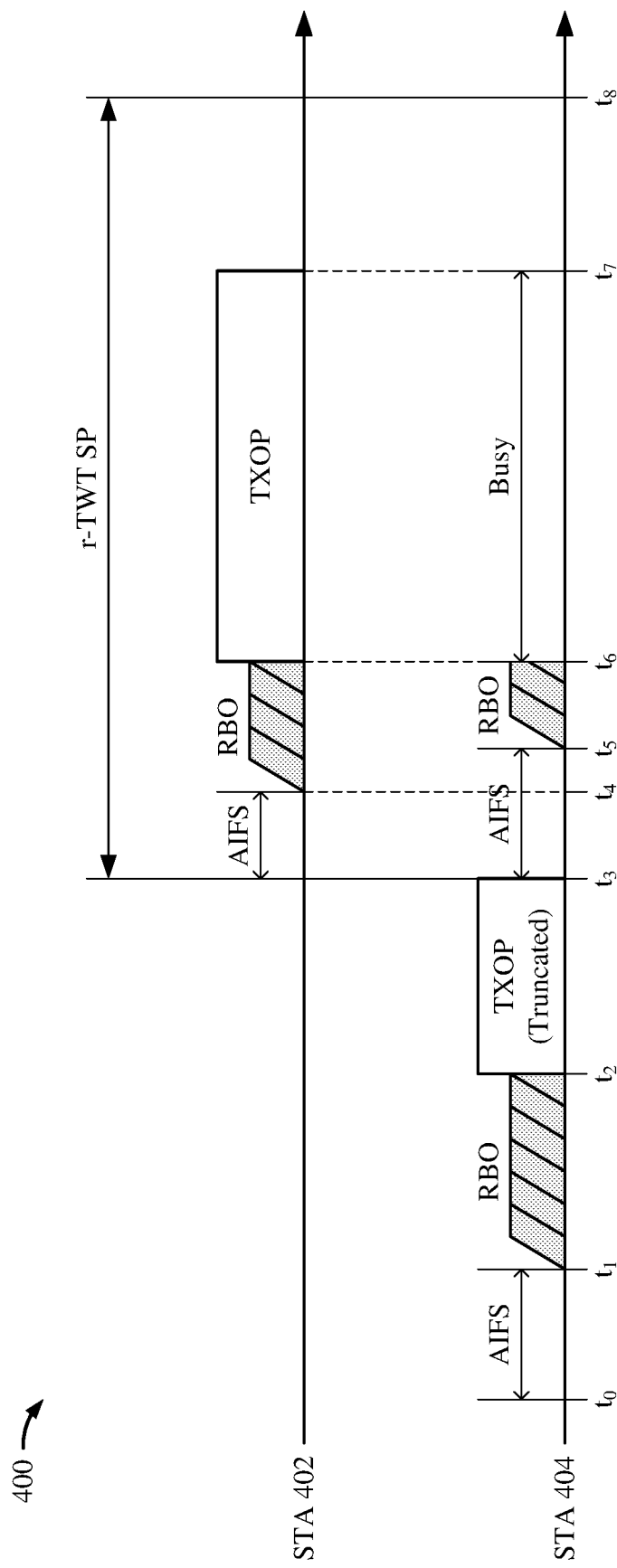
FIG. 4 shows a timing diagram depicting an example of wireless communication among devices belonging to a basic service set (BSS).

FIG. 4 shows a timing diagram 400 depicting an example of wireless communication among devices belonging to a BSS. In the example of FIG. 4, the BSS may include multiple non-legacy STAs 402 and 404 that support r-TWT operation. More specifically, the STA 402 may be a low-latency STA that is a member of an r-TWT SP, which spans a duration from times $t_3$ to $t_8$, whereas the STA 404 may be a non-member STA. In some implementations, each of the STAs 402 and 404 may be one example of any of the STAs 120a-120i of FIG. 1 or the STA 200 of FIG. 2. Although only two non-legacy STAs 402 and 404 are shown in the example of FIG. 4, in actual implementations the BSS may include any number of legacy or non-legacy STAs.

The non-member STA 404 attempts to access a shared wireless channel prior to the start of the r-TWT SP. More specifically, the non-member STA 404 senses that the channel is idle for a threshold duration, from times $t_0$ to $t_1$, based on a channel sensing operation (such as clear channel assessment (CCA)) and further counts down a random backoff (RBO) duration, from times $t_1$ to $t_2$, before attempting to acquire a TXOP. For example, the threshold duration (from times $t_0$ to $t_1$) may be an arbitration interframe spacing (AIFS) duration associated with a particular access category (AC) of data traffic. Accordingly, the RBO duration (from times $t_1$ to $t_2$) may be randomly selected from a range of RBOs spanning a contention window associated with the AC. At time $t_2$, the non-member STA 404 senses that the wireless channel is still idle and proceeds to acquire a TXOP, for example, by initiating a transmission over the shared channel. In the example of FIG. 4, the desired TXOP may be longer than the duration remaining before the start of the r-TWT SP at time $t_3$. However, because the existing rules regarding r-TWT operation require non-member STAs to terminate their TXOPs by the start of an r-TWT SP, the non-member STA 404 must truncate its TXOP between times $t_2$ to $t_3$.

The low-latency STA 402 attempts to access the shared wireless channel at the start of the r-TWT SP. In the example of FIG. 4, the low-latency STA 402 senses that the channel is idle for an AIFS duration, from times $t_3$ to $t_4$, and further counts down an RBO duration, from times $t_4$ to $t_6$, before attempting to acquire a TXOP. As shown in FIG. 4, the non-member STA 404 also attempts to access the shared wireless channel at the start of the r-TWT SP. For example, the non-member STA 404 senses that the channel is idle for an AIFS duration, from times $t_3$ to $t_5$, and further counts down an RBO duration beginning at time $t_5$. In some implementations, the data traffic associated with the low-latency STA 402 may be assigned to a higher-priority AC than the data traffic associated with the non-member STA 404. As such, the AIFS or RBO durations associated with the low-latency STA 402 may be shorter than the AIFS or RBO durations, respectively, associated with the non-member STA 404. As a result, the low-latency STA 402 wins access to the wireless channel, at time $t_6$, and acquires a TXOP, for example, by initiating a transmission over the shared channel.

The non-member STA 404 senses that the wireless channel is busy, at time $t_6$, and refrains from accessing the shared channel for the duration of the TXOP (from times $t_6$ to $t_7$). After the TXOP has terminated, at time $t_7$, the non-member STA 404 may once again attempt to access the wireless channel. In this manner, the r-TWT operation may prioritize latency-sensitive traffic in the BSS, for example, by requiring non-member STAs to terminate their TXOPs by the start of any r-TWT SPs of which they are not members. Additionally, an AP (not shown for simplicity) may suppress all traffic from legacy STAs associated with the BSS by scheduling a quiet interval to overlap with at least a portion of the r-TWT SP (such as one or more time-units (TUs) beginning at time $t_3$). For example, the duration of the quiet interval may be indicated by one or more quiet elements included in management frames (such as beacon frames or probe response frames) transmitted by the AP prior to the start of the r-TWT SP.

Figure 5:
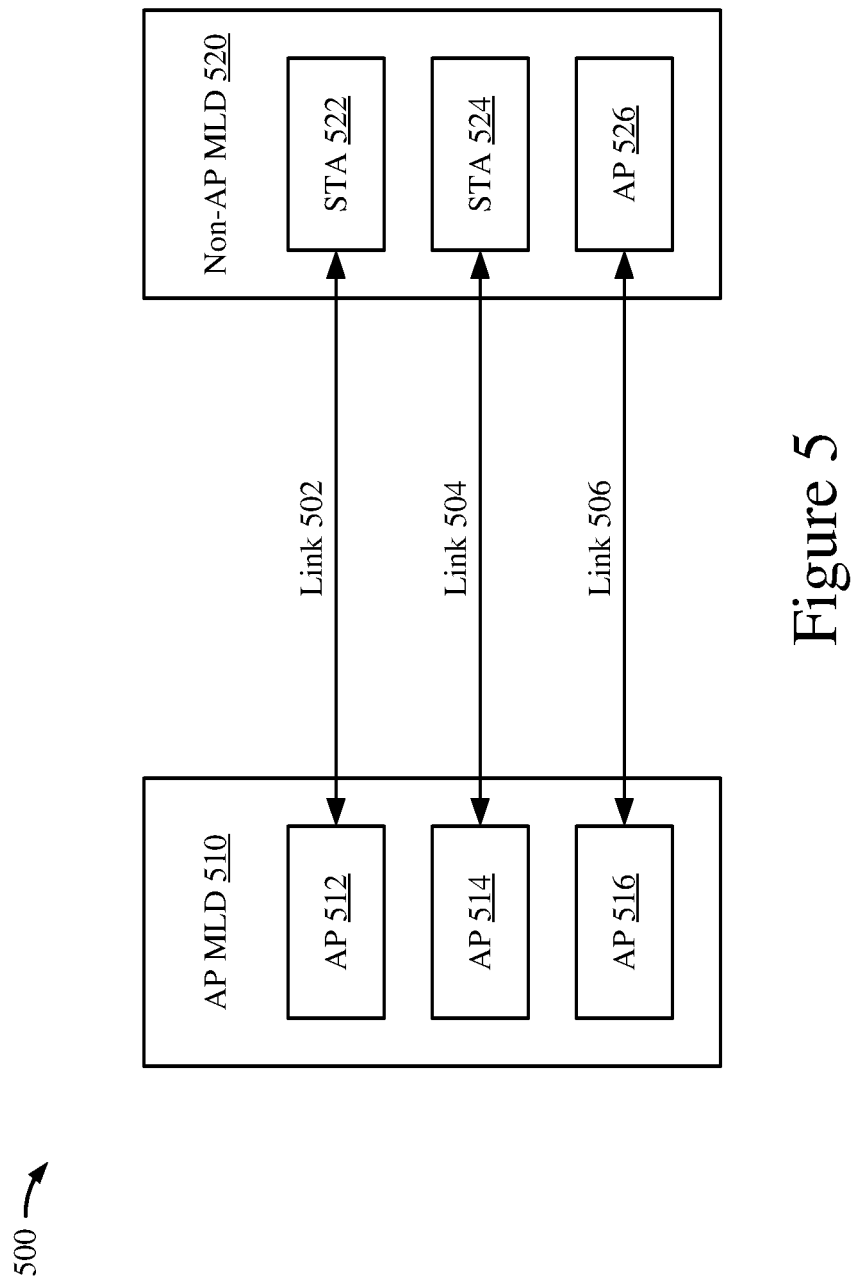
FIG. 5 shows an example communication system that includes an access point (AP) multi-link device (MLD) and a non-AP MLD.

FIG. 5 shows an example communication system 500 that includes an AP MLD 510 and a non-AP MLD 520. In some implementations, the AP MLD 510 may be one example of any of the APs 110 or 300 of FIGS. 1 and 3, respectively. In some implementations, the non-AP MLD 520 may be one example of any of the STAs 120a-120i of FIG. 1 or the STA 200 of FIG. 2.

The AP MLD 510 includes multiple APs 512-516 associated with (or operating on) communication links 502-506, respectively. In the example of FIG. 5, the AP MLD 510 is shown to include only 3 APs. However, in some implementations, the AP MLD 510 may include fewer or more APs than those depicted in FIG. 5. Although the APs 512-516 may share a common association context (through the AP MLD 510), each of the APs 512-516 may establish a respective BSS on its associated communication link. The APs 512-516 also may establish their respective communication links 502-506 on different frequency bands. For example, the AP 512 may operate on the 2.4 GHz frequency band, the AP 514 may operate on the 5 GHz frequency band, and the AP 516 may operate on the 6 GHz frequency band.

The non-AP MLD 520 includes multiple STAs 522-526 that may be configured to communicate on the communication links 502-506, respectively. Thus, the STA 522 may operate on the 2.4 GHz frequency band, the STA 524 may operate on the 5 GHz frequency band, and the STA 526 may operate on the 6 GHz frequency band. In the example of FIG. 5, the non-AP MLD 520 is shown to include only 3 STAs. However, in some implementations, the non-AP MLD 520 may include fewer or more STAs than those depicted in FIG. 5. The IEEE 802.11be amendment of the IEEE 802.11 standard defines several modes in which a non-AP MLD may operate. The various operating modes depend on the number of wireless radios associated with the non-AP MLD and its ability to communicate (such as by transmitting or receiving) concurrently on multiple communication links.

In some implementations, the non-AP MLD 520 may include a single radio or may otherwise be capable of communicating on only one link at a time. In such implementations, the non-AP MLD 520 may operate in a multi-link single-radio (MLSR) mode or an enhanced MLSR (EMLSR) mode. A non-AP MLD operating in the EMLSR mode can listen for specific types of communications (such as buffer status report poll (BSRP) frames or multi-user request-to-send (MU-RTS) frames) on multiple communication links, concurrently, but can only transmit or receive on one communication link at any given time. For example, the STAs 522 and 524 may concurrently listen on their respective links 502 and 504 during a listen interval. However, if the STA 522 detects a BSRP frame on link 502, the non-AP MLD 520 subsequently tunes each of its antennas (including the antenna used by the STA 524 during the listen interval) to operate on link 502. By contrast, a non-AP MLD operating in the MLSR mode can only listen to, and transmit or receive on, one communication link at any given time. For example, the STA 522 must be in a power save mode any time the STA 524 is active.

In some other implementations, the non-AP MLD 520 may include multiple radios and may be capable of concurrent communications on each of the links. In such implementations, the non-AP MLD 520 may operate in a multi-link multi-radio (MLMR) simultaneous transmit and receive (STR) mode or a multi-link multi-radio non-STR (NSTR) mode. A non-AP MLD operating in the MLMR STR mode can simultaneously (or concurrently) transmit and receive on multiple communication links. For example, the STA 522 may transmit or receive on link 502 while the STA 524 concurrently transmits or receives on link 504. More specifically, such communications may be asynchronous. In other words, the STA 522 may be transmitting on link 502 while the STA 524 is receiving on link 504. By contrast, a non-AP MLD operating in the MLMR NSTR mode can simultaneously transmit and receive on multiple communication links only if such communications are synchronous. For example, the STAs 524 and 526 may concurrently transmit on links 504 and 506 and may concurrently receive on links 504 and 506. However, the STA 524 cannot be transmitting on link 504 while the STA 526 is receiving on link 506.

Still further, a non-AP MLD may include multiple radios but may be capable of concurrent communications on only a subset of the links. In such implementations, the non-AP MLD 520 may operate in an enhanced MLMR (EMLMR) mode or a hybrid EMLSR mode. A non-AP MLD operating in the EMLMR mode supports MLMR STR operation between certain pairs of communication links. For example, the STAs 522 and 524 may concurrently communicate on their respective links 502 and 504 in accordance with the MLMR STR mode of operation. However, the STAs 524 and 526 cannot concurrently transmit or receive on the links 504 and 506 (referred to herein as "EMLMR links"). As such, the STAs 524 and 526 may "pool" their antennas so that each of the STAs 524 and 526 can utilize the other STA's antennas when transmitting or receiving on one of the EMLMR links. On the other hand, a non-AP MLD operating in the hybrid EMLSR mode supports MLMR STR operation between certain pairs of communication links and EMLSR operation between other pairs of communication links. For example, the STAs 522 and 524 may concurrently communicate on their respective links 502 and 504 in accordance with the MLMR STR mode and the STAs 524 and 526 may concurrently listen to their respective links 504 and 506 in accordance with the EMLSR mode.

Although existing versions of the IEEE 802.11 standard support MLO and r-TWT operation, they do not describe how the r-TWT operation can be integrated with the MLO architecture. More specifically, the existing rules regarding r-TWT operation may prevent STAs that operate on a given wireless channel from interfering with latency-sensitive communications by low-latency STAs operating on the same wireless channel. For example, non-legacy STAs that support r-TWT operation and acquire TXOPs outside of an r-TWT SP must terminate their respective TXOPs before the start of any r-TWT SP for which they are not a member. Further, an AP may suppress traffic from all legacy STAs during an r-TWT SP by scheduling a quiet interval to overlap with the r-TWT SP. However, existing versions of the IEEE 802.11 standard do not describe how a non-AP MLD can satisfy the latency requirements associated with its latency-sensitive traffic while communicating across multiple communication links. For example, the existing rules regarding r-TWT operation may not prevent a first STA of a non-AP MLD from interfering with latency-sensitive communications by a second STA of the same non-AP MLD.

Figure 6A:
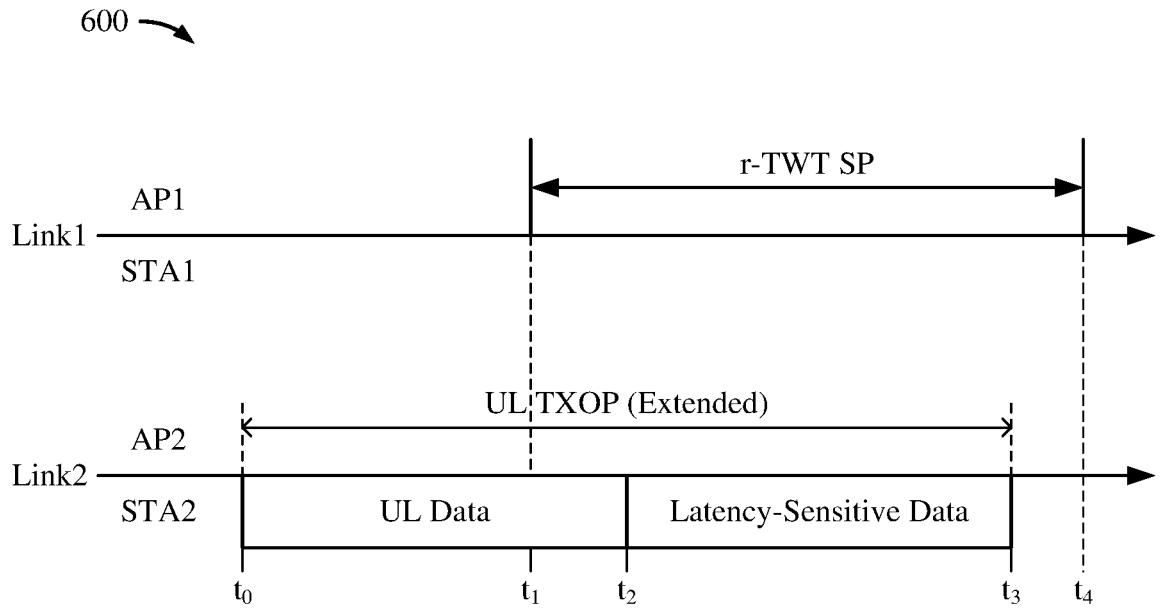
FIGS. 6A and 6B show timing diagrams depicting examples of wireless communication between an AP MLD and a non-AP MLD.

FIG. 6A shows a timing diagram 600 depicting an example of wireless communication between an AP MLD and a non-AP MLD. In some implementations, the AP MLD and the non-AP MLD may be examples of the AP MLD 510 and the non-AP MLD 520, respectively, of FIG. 5. In the example of FIG. 6A, the AP MLD is shown to include access points AP1 and AP2 and the non-AP MLD is shown to include wireless stations STA1 and STA2. The AP MLD is configured to communicate with the non-AP MLD via multiple communication links Link1 and Link2. More specifically, AP1 and STA1 are configured to operate on Link1 whereas AP2 and STA2 are configured to operate on Link2.

In some implementations, the non-AP MLD may not be capable of concurrent and asynchronous communications on the communication links Link1 and Link2. For example, the non-AP MLD may be configured to operate in an MLSR, EMLSR, MLMR NSTR, or EMLMR mode. In the example of FIG. 6A, Link1 is an r-TWT link and Link2 is a non-r-TWT Link. More specifically, an r-TWT SP is scheduled to occur on Link1 from times $t_1$ to $t_4$. At time $t_0$, the non-AP MLD acquires an uplink (UL) TXOP on Link2 and proceeds to transmit UL data until time $t_2$. As shown in FIG. 6A, the UL data transmission continues past the start of the r-TWT SP (at time $t_1$). However, because the non-AP MLD is not capable of concurrent and asynchronous communications on Link1 and Link2, the non-AP MLD cannot transmit or receive latency-sensitive traffic on Link1 while it is transmitting the UL data on Link2 (such as between times $t_1$ and $t_2$).

In some aspects, the non-AP MLD may extend its UL TXOP to accommodate an exchange of latency-sensitive data. For example, rather than terminate the UL TXOP on Link2 upon completion of the UL data transmission (at time $t_2$), the non-AP MLD may proceed to transmit latency-sensitive data on Link2 from times $t_2$ to $t_3$. As such, the UL TXOP is effectively extended from time $t_2$ to time $t_3$. As shown in FIG. 6A, the latency-sensitive data exchange (from times $t_2$ to $t_3$) coincides with the r-TWT SP (from times $t_1$ to $t_4$). Accordingly, the non-AP MLD may be able to satisfy the latency requirements associated with the latency-sensitive data even though the data is transmitted on Link2 rather than Link1.

In some aspects, the non-AP MLD may decide whether to extend the UL TXOP based on one or more channel conditions associated with each of the communication links Link1 and Link2. As used herein, the term "channel conditions" may refer to any properties or characteristics associated with the communication link that may affect the transmission or reception of data thereon. Example suitable channel conditions may include, among other examples, a level of interference (such as from an overlapping BSS (OBSS)), a bandwidth of the channel, and a modulation and coding scheme (MCS) used for communications. In some implementations, the non-AP MLD may perform a channel comparison operation that compares the channel conditions associated with Link1 and Link2 and indicates which of the communication links has the superior (or more favorable) channel conditions.

In some implementations, the non-AP MLD may extend the UL TXOP on Link2 only if Link2 is determined to have superior channel conditions (compared to Link1). In other words, the non-AP MLD may terminate the UL TXOP before time $t_3$, without transmitting any latency-sensitive data on Link2, if Link1 is determined to have superior channel conditions (compared to Link 2). In some other implementations, the non-AP MLD may determine whether to acquire the UL TXOP on Link2 based on the channel conditions associated with each of the communication links Link1 and Link2. For example, the non-AP MLD may proceed to acquire the UL TXOP, from times $t_0$ to $t_3$, only if it determines (prior to time $t_0$) that Link2 has superior channel conditions (compared to Link1). However, the non-AP MLD may not initiate the UL data transmission at time $t_0$ if it determines that Link1 has superior channel conditions (compared to Link2).

Figure 6B:
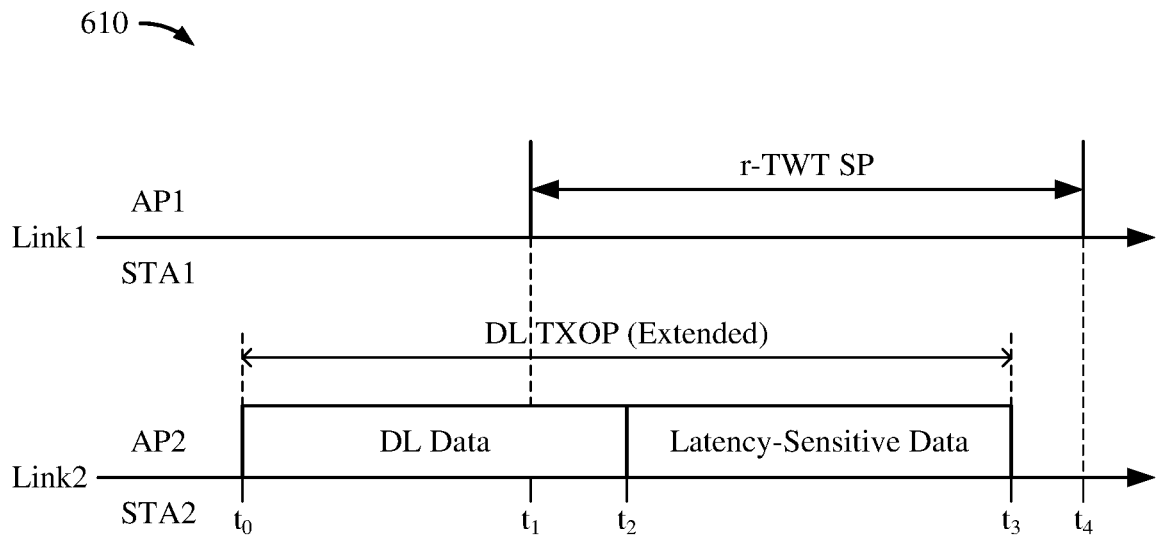

FIG. 6B shows a timing diagram 610 depicting an example of wireless communication between an AP MLD and a non-AP MLD. In some implementations, the AP MLD and the non-AP MLD may be examples of the AP MLD 510 and the non-AP MLD 520, respectively, of FIG. 5. In the example of FIG. 6B, the AP MLD is shown to include access points AP1 and AP2 and the non-AP MLD is shown to include wireless stations STA1 and STA2. The AP MLD is configured to communicate with the non-AP MLD via multiple communication links Link1 and Link2. More specifically, AP1 and STA1 are configured to operate on Link1 whereas AP2 and STA2 are configured to operate on Link2.

In some implementations, the non-AP MLD may not be capable of concurrent and asynchronous communications on the communication links Link1 and Link2. For example, the non-AP MLD may be configured to operate in an MLSR, EMLSR, MLMR NSTR, or EMLMR mode. In the example of FIG. 6B, Link1 is an r-TWT link and Link2 is a non-r-TWT Link. More specifically, an r-TWT SP is scheduled to occur on Link1 from times $t_1$ to $t_4$. At time $t_0$, the AP MLD acquires a downlink (DL) TXOP on Link2 and proceeds to transmit DL data until time $t_2$. As shown in FIG. 6B, the DL data transmission continues past the start of the r-TWT SP (at time $t_1$). However, because the non-AP MLD is not capable of concurrent and asynchronous communications on Link1 and Link2, the non-AP MLD cannot transmit or receive latency-sensitive traffic on Link1 while the AP MLD is transmitting the DL data on Link2 (such as between times $t_1$ and $t_2$).

In some aspects, the AP MLD may extend its DL TXOP to accommodate an exchange of latency-sensitive data. For example, rather than terminate the DL TXOP on Link2 upon completion of the DL data transmission (at time $t_2$), the AP MLD may proceed to transmit latency-sensitive data on Link2 from times $t_2$ to $t_3$. As such, the DL TXOP is effectively extended from time $t_2$ to time $t_3$. As shown in FIG. 6B, the latency-sensitive data exchange (from times $t_2$ to $t_3$) coincides with the r-TWT SP (from times $t_1$ to $t_4$). Accordingly, the non-AP MLD may be able to satisfy the latency requirements associated with the latency-sensitive data even though the data is transmitted on Link2 rather than Link1.

In some aspects, the AP MLD may decide whether to extend the DL TXOP based on one or more channel conditions associated with each of the communication links Link1 and Link2. As described herein, example suitable channel conditions may include, among other examples, a level of interference (such as from an OBSS), a bandwidth of the channel, and an MCS used for communications. In some implementations, the AP MLD may perform a channel comparison operation that compares the channel conditions associated with Link1 and Link2 and indicates which of the communication links has the superior (or more favorable) channel conditions.

In some implementations, the AP MLD may extend the DL TXOP on Link2 only if Link2 is determined to have superior channel conditions (compared to Link1). In other words, the AP MLD may terminate the DL TXOP before time $t_3$, without transmitting any latency-sensitive data on Link2, if Link1 is determined to have superior channel conditions (compared to Link 2). In some other implementations, the AP MLD may determine whether to acquire the DL TXOP on Link2 based on the channel conditions associated with each of the communication links Link1 and Link2. For example, the AP MLD may proceed to acquire the DL TXOP, from times $t_0$ to $t_3$, only if it determines (prior to time $t_0$) that Link2 has superior channel conditions (compared to Link1). However, the AP MLD may not initiate the DL data transmission at time $t_0$ if it determines that Link1 has superior channel conditions (compared to Link2).

Aspects of the present disclosure recognize that, under some circumstances, the UL or DL TXOP may not be extendible in the manner described with reference to FIGS. 6A and 6B. For example, the non-AP MLD may not extend an UL TXOP that is allocated by the AP MLD. For example, if the UL data transmission represents a trigger-based (TB) physical layer convergence protocol (PLCP) protocol data unit (PPDU), the duration of the TB PPDU will be specified (and therefore fixed) by a trigger frame transmitted by the AP MLD soliciting the TB PPDU. Further, neither the AP MLD nor the non-AP MLD may be able to transmit latency-sensitive data on a non-r-TWT link if a traffic identifier (TID) associated with the latency-sensitive data (such as voice (VO) or video (VI)) is not mapped to the non-r-TWT link. Moreover, under some circumstances, the AP MLD or the non-AP MLD may prefer to transmit or receive the latency-sensitive data on the r-TWT link (such as when r-TWT links is determined to have superior channel conditions).

Figure 7A:
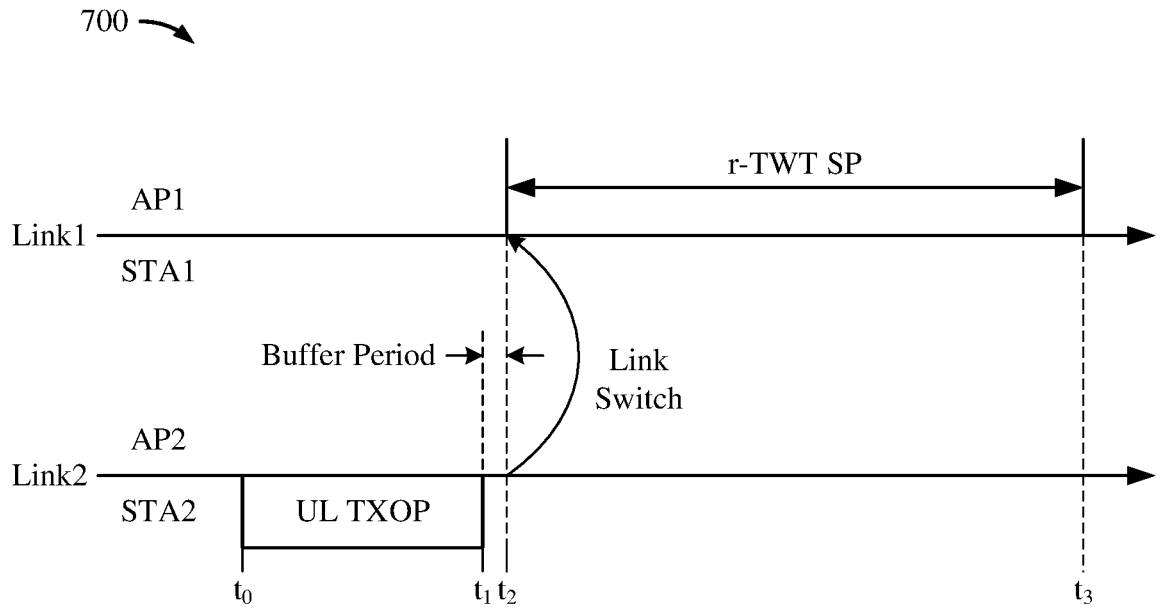
FIGS. 7A and 7B show timing diagrams depicting examples of wireless communication between an AP MLD and a non-AP MLD.

FIG. 7A shows a timing diagram 700 depicting an example of wireless communication between an AP MLD and a non-AP MLD. In some implementations, the AP MLD and the non-AP MLD may be examples of the AP MLD 510 and the non-AP MLD 520, respectively, of FIG. 5. In the example of FIG. 7A, the AP MLD is shown to include access points AP1 and AP2 and the non-AP MLD is shown to include wireless stations STA1 and STA2. The AP MLD is configured to communicate with the non-AP MLD via multiple communication links Link1 and Link2. More specifically, AP1 and STA1 are configured to operate on Link1 whereas AP2 and STA2 are configured to operate on Link2.

In some implementations, the non-AP MLD may not be capable of concurrent and asynchronous communications on the communication links Link1 and Link2. For example, the non-AP MLD may be configured to operate in an MLSR, EMLSR, MLMR NSTR, or EMLMR mode. In the example of FIG. 7A, Link1 is an r-TWT link and Link2 is a non-r-TWT Link. More specifically, an r-TWT SP is scheduled to occur on Link1 from times $t_2$ to $t_3$. At time $t_0$, the non-AP MLD acquires a UL TXOP on Link2 and may proceed to transmit UL data associated with the UL TXOP. However, because the non-AP MLD is not capable of concurrent and asynchronous communications on Link1 and Link2, the non-AP MLD cannot transmit or receive latency-sensitive traffic on Link1 while it is transmitting the UL data on Link2).

In some aspects, the non-AP MLD may terminate its UL TXOP prior to the start of the r-TWT SP (at time $t_2$). As shown in FIG. 7A, the UL TXOP is terminated at time $t_1$. In some implementations, the non-AP MLD may terminate the UL TXOP on Link2 by transmitting a packet (such as a medium access control (MAC) protocol data unit (MPDU)) on Link2, at time $t_1$, having a power management (PM) bit set to "1" (indicating that STA2 is entering a power save mode). In such implementations, STA1 may provide timing information to STA2 indicating the timing of the r-TWT SP so that STA2 can terminate its UL TXOP at an appropriate time.

In some other aspects, the AP MLD may terminate the UL TXOP prior to the start of the r-TWT SP. In some implementations, the AP MLD may terminate the UL TXOP by transmitting a control frame (such as an acknowledgement (ACK) frame or a block acknowledgement (BA) frame) on Link2, at or before time $t_1$, having a PM bit set to "1" (indicating that AP2 is requesting STA2 to terminate its TXOP and enter a power save mode). For example, the control frame may be transmitted in response to one or more UL packets received from the non-AP MLD. In such implementations, AP1 may provide timing information to AP2 indicating the timing of the r-TWT SP so that AP2 can terminate the UL TXOP at an appropriate time.

Still further, in some aspects, the AP MLD may schedule the UL TXOP to terminate prior to the start of the r-TWT SP. For example, the AP MLD may allocate the UL TXOP by transmitting a trigger frame on Link2 soliciting a TB PPDU from the non-AP MLD. The trigger frame specifies the duration of the UL TXOP. As such, the trigger frame may indicate that the UL TXOP is to terminate at time $t_1$. In such aspects, AP1 may provide timing information to AP2 indicating the timing of the r-TWT SP so that AP2 can schedule the UL TXOP to terminate at an appropriate time.

Upon termination of the UL TXOP on Link2, the non-AP MLD may proceed to exchange latency-sensitive traffic on Link1 between times $t_2$ and $t_3$. Although not shown, for simplicity, the non-AP MLD may transmit or receive latency-sensitive data on Link1 at any time during the r-TWT SP (such as described with reference to FIG. 4). Accordingly, the non-AP MLD may be able to satisfy the latency requirements associated with the latency-sensitive data by switching between Link1 and Link2 based on the timing of r-TWT SPs.

Aspects of the present disclosure recognize that, in some implementations, the non-AP MLD may be able to switch (such as immediately and dynamically) between the communication links (such as when the non-AP MLD is operating in the MLMR NSTR mode). However, in some other implementations, the non-AP MLD may incur a delay in switching between the communication links. Thus, in some aspects, the UL TXOP may be terminated a threshold duration before the start of the r-TWT SP. The threshold duration (also referred to herein as a "buffer period"), between times $t_1$ and $t_2$, may be greater than or equal to a delay associated with switching communications over from Link2 to Link1.

In some implementations, the delay may be a transition delay required by the non-AP MLD to transition from an active mode on Link2 to an active mode on Link1 (such as in accordance with an MLSR mode of non-AP MLD operation). In such implementations, the transition delay may include a delay associated with transitioning a wireless radio from operating on Link2 to operating on Link1 and a delay associated with transmitting power management information on Link2 indicating that STA2 or AP2 is entering a power save mode. In some other implementations, the delay may be a transition delay required by the non-AP MLD to transition from a transmitting or receiving state to a listening state (such as in accordance with an EMLSR mode of non-AP MLD operation). Still further, in some implementations, the delay may be a switchback delay required by the non-AP MLD to switch its antennas over from Link2 to Link1 (such as in accordance with the EMLMR mode of non-AP MLD operation).

Figure 7B:
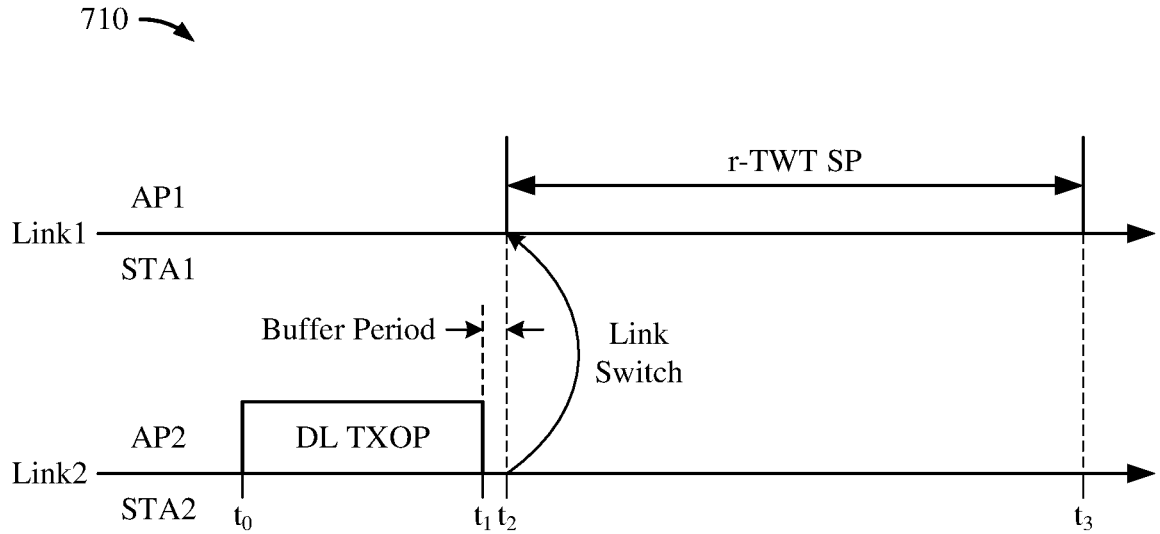

FIG. 7B shows a timing diagram 710 depicting an example of wireless communication between an AP MLD and a non-AP MLD. In some implementations, the AP MLD and the non-AP MLD may be examples of the AP MLD 510 and the non-AP MLD 520, respectively, of FIG. 5. In the example of FIG. 7B, the AP MLD is shown to include access points AP1 and AP2 and the non-AP MLD is shown to include wireless stations STA1 and STA2. The AP MLD is configured to communicate with the non-AP MLD via multiple communication links Link1 and Link2. More specifically, AP1 and STA1 are configured to operate on Link1 whereas AP2 and STA2 are configured to operate on Link2.

In some implementations, the non-AP MLD may not be capable of concurrent and asynchronous communications on the communication links Link1 and Link2. For example, the non-AP MLD may be configured to operate in an MLSR, EMLSR, MLMR NSTR, or EMLMR mode. In the example of FIG. 7B, Link1 is an r-TWT link and Link2 is a non-r-TWT Link. More specifically, an r-TWT SP is scheduled to occur on Link1 from times $t_2$ to $t_3$. At time $t_0$, the AP MLD acquires a DL TXOP on Link2 and may proceed to transmit DL data associated with the DL TXOP. However, because the non-AP MLD is not capable of concurrent and asynchronous communications on Link1 and Link2, the non-AP MLD cannot transmit or receive latency-sensitive traffic on Link1 while the AP MLD is transmitting the DL data on Link2.

In some aspects, the AP MLD may terminate its DL TXOP prior to the start of the r-TWT SP (at time $t_2$). As shown in FIG. 7B, the DL TXOP is terminated at time $t_1$. In some implementations, the AP MLD may terminate the DL TXOP on Link2 by transmitting a packet (such as an MPDU) on Link2, at time $t_1$, having a PM bit set to "1" (indicating that STA2 is requesting to enter a power save mode). In such implementations, AP1 may provide timing information to AP2 indicating the timing of the r-TWT SP so that AP2 can terminate its DL TXOP at an appropriate time.

In some other aspects, the non-AP MLD may terminate the DL TXOP prior to the start of the r-TWT SP. In some implementations, the non-AP MLD may terminate the DL TXOP by transmitting a control frame (such as an ACK frame or a BA frame) on Link2, at or before time $t_1$, having a PM bit set to "1" (indicating the STA2 is entering a power save mode). For example, the control frame may be transmitted in response to one or more DL packets received from the AP MLD. In such implementations, STA1 may provide timing information to STA2 indicating the timing of the r-TWT SP so that STA2 can terminate the DL TXOP at an appropriate time.

Still further, in some aspects, the non-AP MLD may switch operation to Link1 without signaling the switch on Link2. For example, the non-AP MLD may not have time to transmit an ACK or BA frame on Link2 on or before time $t_1$. In such aspects, the non-AP MLD may switch over to Link1, at time $t_1$, without indicating to the AP MLD that STA2 is entering a power save state on Link2. However, in doing so, the non-AP MLD risks losing any DL data it received on Link2 prior to time $t_1$.

Upon termination of the DL TXOP on Link2, the non-AP MLD may switch its operation from Link2 to Link1 and may proceed to exchange latency-sensitive traffic on Link1 between times $t_2$ and $t_3$. Although not shown, for simplicity, the non-AP MLD may transmit or receive latency-sensitive data on Link1 at any time during the r-TWT SP (such as described with reference to FIG. 4). Accordingly, the non-AP MLD may be able to satisfy the latency requirements associated with the latency-sensitive data by switching between Link1 and Link2 based on the timing of r-TWT SPs.

Aspects of the present disclosure recognize that, in some implementations, the non-AP MLD may be able to switch (such as immediately and dynamically) between the communication links (such as when the non-AP MLD is operating in the MLMR NSTR mode). However, in some other implementations, the non-AP MLD may incur a delay in switching between the communication links. Thus, in some aspects, the DL TXOP may be terminated a threshold duration before the start of the r-TWT SP. The threshold duration (or buffer period), between times $t_1$ and $t_2$, may be greater than or equal to a delay associated with switching communications over from Link2 to Link1.

In some implementations, the delay may be a transition delay required by the non-AP MLD to transition from an active mode on Link2 to an active mode on Link1 (such as in accordance with an MLSR mode of non-AP MLD operation). In such implementations, the transition delay may include a delay associated with transitioning a wireless radio from operating on Link2 to operating on Link1 and a delay associated with transmitting power management information on Link2 indicating that STA2 or AP2 is entering a power save mode. In some other implementations, the delay may be a transition delay required by the non-AP MLD to transition from a transmitting or receiving state to a listening state (such as in accordance with an EMLSR mode of non-AP MLD operation). Still further, in some implementations, the delay may be a switchback delay required by the non-AP MLD to switch its antennas over from Link2 to Link1 (such as in accordance with the EMLMR mode of non-AP MLD operation).

Figure 8A:
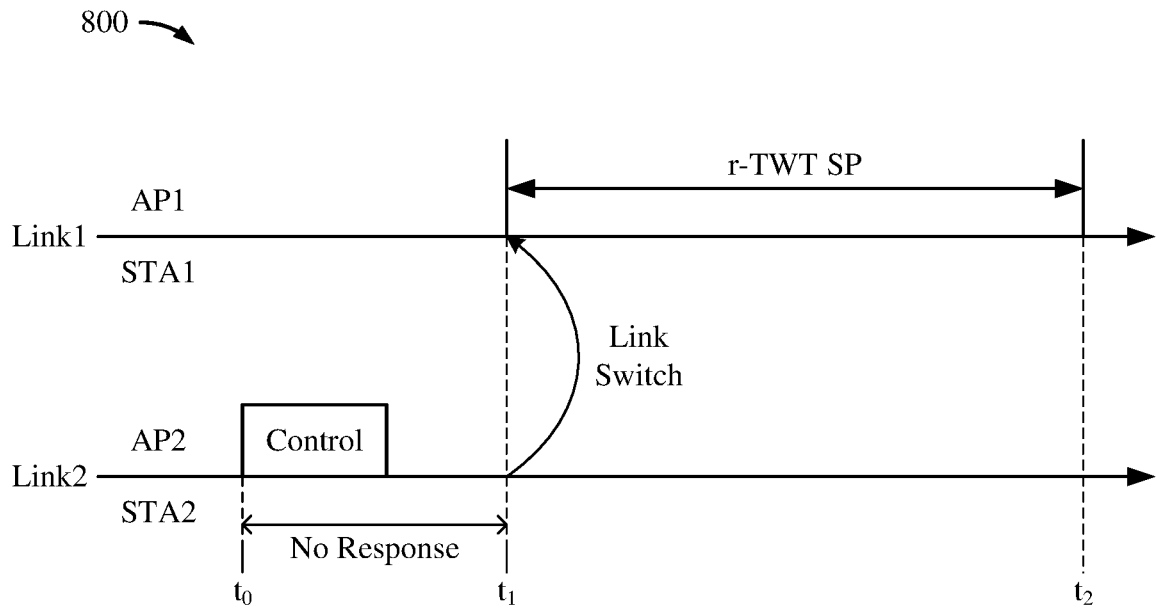
FIGS. 8A and 8B show timing diagrams depicting examples of wireless communication between an AP MLD and a non-AP MLD.

FIG. 8A shows a timing diagram 800 depicting an example of wireless communication between an AP MLD and a non-AP MLD. In some implementations, the AP MLD and the non-AP MLD may be examples of the AP MLD 510 and the non-AP MLD 520, respectively, of FIG. 5. In the example of FIG. 8A, the AP MLD is shown to include access points AP1 and AP2 and the non-AP MLD is shown to include wireless stations STA1 and STA2. The AP MLD is configured to communicate with the non-AP MLD via multiple communication links Link1 and Link2. More specifically, AP1 and STA1 are configured to operate on Link1 whereas AP2 and STA2 are configured to operate on Link2.

In some implementations, the non-AP MLD may not be capable of concurrent and asynchronous communications on the communication links Link1 and Link2. For example, the non-AP MLD may be configured to operate in an MLSR, EMLSR, MLMR NSTR, or EMLMR mode. In the example of FIG. 8A, Link1 is an r-TWT link and Link2 is a non-r-TWT Link. More specifically, an r-TWT SP is scheduled to occur on Link1 from times $t_1$ to $t_2$. At time $t_0$, the AP MLD transmits a control frame on Link2 soliciting a response from the non-AP MLD. In some implementations, the control frame may be a BSRP frame that solicits a buffer status report (BSR) in response thereto. In some other implementations, the control frame may be an MU-RTS frame that solicits a clear-to-send (CTS) in response thereto. Still further, in some implementations, the control frame may be a trigger frame that solicits a TB PPDU in response thereto.

In some aspects, the non-AP MLD may decide whether to respond to the control frame based on the amount of time remaining before the start of the r-TWT SP. For example, the non-AP MLD may perform a timing measurement operation that indicates the amount of time remaining before the start of the r-TWT SP (such as between times $t_0$ and $t_1$). In some implementations, the non-AP MLD may ignore or otherwise refrain from responding to the control frame if the remaining time is less than a threshold amount of time necessary (or otherwise suitable) to support an exchange of UL or DL data. For example, the non-AP MLD may not respond to the control frame if there is not enough time to support a TXOP before the start of the r-TWT SP or if the resulting TXOP would be too short (such as less than a threshold duration).

In some other aspects, the non-AP MLD may decide whether to respond to the control frame based on one or more channel conditions associated with each of the communication links Link1 and Link 2. As described herein, example suitable channel conditions may include, among other examples, a level of interference (such as from an OBSS), a bandwidth of the channel, and an MCS used for communications. For example, the non-AP MLD may perform a channel comparison operation that compares the channel conditions associated with Link1 and Link2 and indicates which of the communication links has the superior (or more favorable) channel conditions. In some implementations, the non-AP MLD ignore or otherwise refrain from responding to the control frame if the channel comparison operation indicates that Link1 is associated with superior channel conditions (compared to Link2).

In the example of FIG. 8A, the non-AP MLD does not respond to the control frame at time $t_0$. Rather, the non-AP MLD may switch its operation from Link2 to Link1, prior to time $t_1$, and may proceed to exchange latency-sensitive traffic on Link1 between times $t_1$ and $t_2$. Although not shown, for simplicity, the non-AP MLD may transmit or receive latency-sensitive data on Link1 at any time during the r-TWT SP (such as described with reference to FIG. 4). Accordingly, the non-AP MLD may be able to satisfy the latency requirements associated with the latency-sensitive data by switching between Link1 and Link2 based on the timing of r-TWT SPs.

Figure 8B:
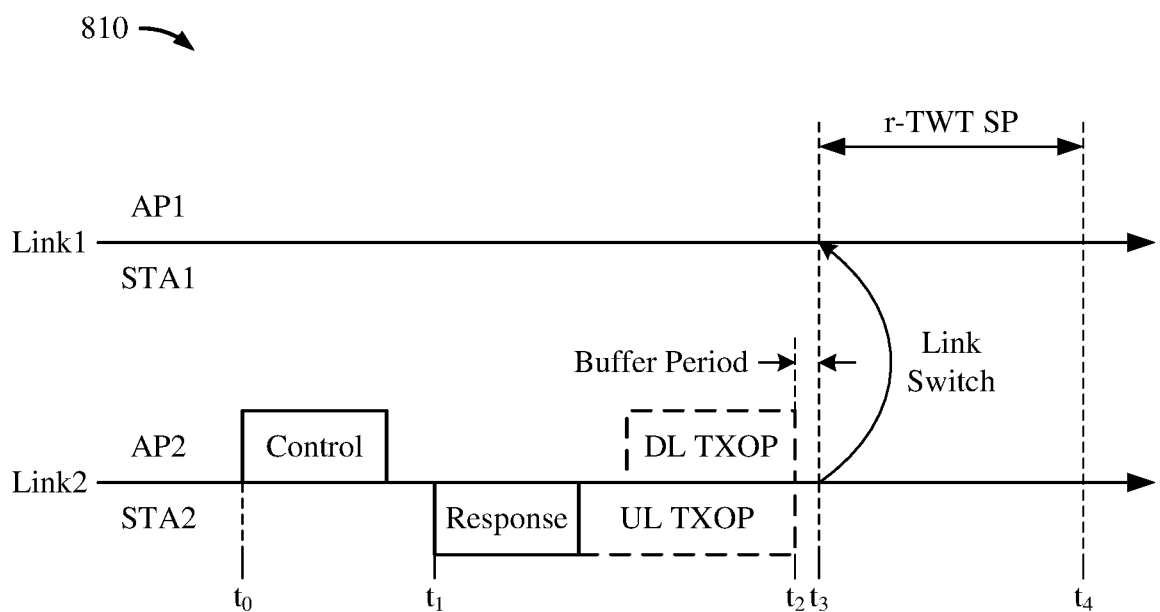

FIG. 8B shows a timing diagram 810 depicting an example of wireless communication between an AP MLD and a non-AP MLD. In some implementations, the AP MLD and the non-AP MLD may be examples of the AP MLD 510 and the non-AP MLD 520, respectively, of FIG. 5. In the example of FIG. 8B, the AP MLD is shown to include access points AP1 and AP2 and the non-AP MLD is shown to include wireless stations STA1 and STA2. The AP MLD is configured to communicate with the non-AP MLD via multiple communication links Link1 and Link2. More specifically, AP1 and STA1 are configured to operate on Link1 whereas AP2 and STA2 are configured to operate on Link2.

In some implementations, the non-AP MLD may not be capable of concurrent and asynchronous communications on the communication links Link1 and Link2. For example, the non-AP MLD may be configured to operate in an MLSR, EMLSR, MLMR NSTR, or EMLMR mode. In the example of FIG. 8B, Link1 is an r-TWT link and Link2 is a non-r-TWT Link. More specifically, an r-TWT SP is scheduled to occur on Link1 from times $t_3$ to $t_4$. At time $t_0$, the AP MLD transmits a control frame on Link2 soliciting a response from the non-AP MLD. In some implementations, the control frame may be a BSRP frame that solicits a BSR in response thereto. In some other implementations, the control frame may be an MU-RTS frame that solicits a CTS in response thereto. Still further, in some implementations, the control frame may be a trigger frame that solicits a TB PPDU in response thereto.

In some aspects, the non-AP MLD may decide whether to respond to the control frame based on the amount of time remaining before the start of the r-TWT SP. For example, the non-AP MLD may perform a timing measurement operation that indicates the amount of time remaining before the start of the r-TWT SP (such as between times $t_0$ and $t_3$). In some implementations, the non-AP MLD may respond to the control frame if the remaining time is greater than or equal to a threshold amount of time necessary (or otherwise suitable) to support an exchange of UL or DL data. For example, the non-AP MLD may respond to the control frame if there is enough time to support a TXOP before the start of the r-TWT SP or if the resulting TXOP would be sufficiently long (such as greater than or equal to a threshold duration).

In some other aspects, the non-AP MLD may decide whether to respond to the control frame based on one or more channel conditions associated with each of the communication links Link1 and Link 2. As described herein, example suitable channel conditions may include, among other examples, a level of interference (such as from an OBSS), a bandwidth of the channel, and an MCS used for communications. For example, the non-AP MLD may perform a channel comparison operation that compares the channel conditions associated with Link1 and Link2 and indicates which of the communication links has the superior (or more favorable) channel conditions. In some implementations, the non-AP MLD may respond to the control frame if the channel comparison operation indicates that Link2 is associated with superior channel conditions (compared to Link1).

In the example of FIG. 8B, the non-AP MLD transmits a response, at time $t_1$, responsive to the control frame received at time $t_0$. For example, the response may include a BSR frame, a CTS frame, or a TB PPDU. In some implementations, the response may include availability information indicating a duration for which the non-AP MLD will remain available for communications on Link2. More specifically, the availability information may indicate that STA2 will not be active on Link2 beyond the start of the r-TWT SP (such as at time $t_3$). In some implementations, the availability information may be carried in an aggregated control (A-Control) field of the response frame. In some other implementations, the availability information may be carried in a duration subfield of the response frame. Accordingly, the non-AP MLD may proceed to transmit UL data (during an UL TXOP), or the AP MLD may proceed to transmit DL data (during a DL TXOP), on Link2 for a duration less than or equal to the time remaining before the start of the r-TWT SP (such as between times $t_1$ and $t_2$).

Upon termination of the DL or UL TXOP on Link2, the non-AP MLD may switch its operation from Link2 to Link1 and may proceed to exchange latency-sensitive traffic on Link1 between times $t_3$ and $t_4$. Although not shown, for simplicity, the non-AP MLD may transmit or receive latency-sensitive data on Link1 at any time during the r-TWT SP (such as described with reference to FIG. 4). Accordingly, the non-AP MLD may be able to satisfy the latency requirements associated with the latency-sensitive data by switching between Link1 and Link2 based on the timing of r-TWT SPs.

Aspects of the present disclosure recognize that, in some implementations, the non-AP MLD may be able to switch (such as immediately and dynamically) between the communication links (such as when the non-AP MLD is operating in the MLMR NSTR mode). However, in some other implementations, the non-AP MLD may incur a delay in switching between the communication links. Thus, in some aspects, the DL or UL TXOP may terminate a threshold duration before the start of the r-TWT SP. The threshold duration (or buffer period), between times $t_2$ and $t_3$, may be greater than or equal to a delay associated with switching communications over from Link2 to Link1.

In some implementations, the delay may be a transition delay required by the non-AP MLD to transition from an active mode on Link2 to an active mode on Link1 (such as in accordance with an MLSR mode of non-AP MLD operation). In such implementations, the transition delay may include a delay associated with transitioning a wireless radio from operating on Link2 to operating on Link1 and a delay associated with transmitting power management information on Link2 indicating that STA2 or AP2 is entering a power save mode. In some other implementations, the delay may be a transition delay required by the non-AP MLD to transition from a transmitting or receiving state to a listening state (such as in accordance with an EMLSR mode of non-AP MLD operation). Still further, in some implementations, the delay may be a switchback delay required by the non-AP MLD to switch its antennas over from Link2 to Link1 (such as in accordance with the EMLMR mode of non-AP MLD operation).

In the examples described with reference to FIGS. 6A-8B, an r-TWT SP is scheduled on only one of the communication links between an AP MLD and a non-AP MLD. In some other aspects, SPs (including r-TWT SPs, individual TWT SPs, and broadcast TWT SPs) may be scheduled on multiple communication links. In some implementations, non-overlapping SPs may be scheduled across multiple communication links to achieve greater latency gains. In some other implementations, overlapping SPs may be scheduled across multiple communication links to achieve greater power savings. Still further, in some implementations, partially-overlapping SPs may be scheduled across multiple communication links to achieve a balance between power savings and latency gains.

Figure 9A:
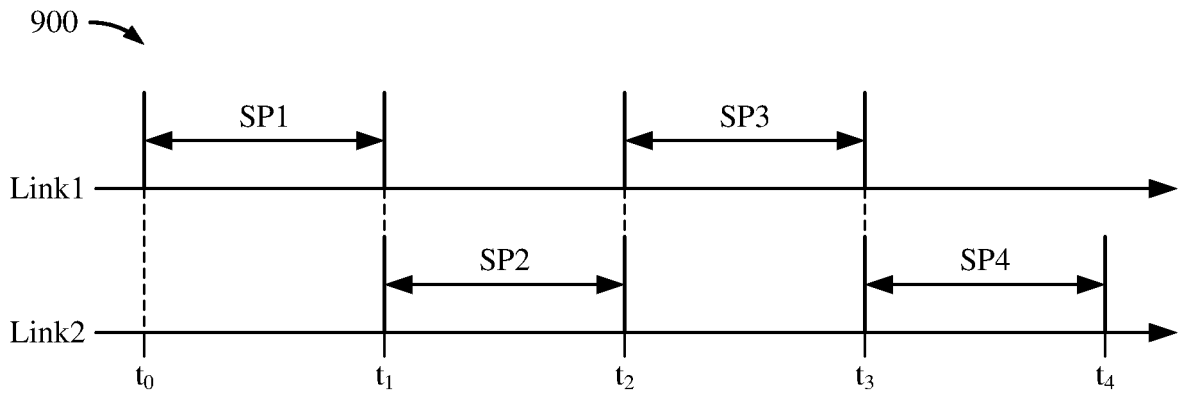
FIGS. 9A-9C show timing diagrams depicting example TWT schedules shared by an AP MLD and a non-AP MLD.

FIG. 9A shows a timing diagram 900 depicting an example TWT schedule shared by an AP MLD and a non-AP MLD. In some implementations, the AP MLD and the non-AP MLD may be examples of the AP MLD 510 and the non-AP MLD 520, respectively, of FIG. 5. As shown in FIG. 9A, the AP MLD is configured to communicate with the non-AP MLD via multiple communication links Link1 and Link2.

In some implementations, the AP MLD and the non-AP MLD may schedule SPs on the communication links Link1 and Link2 in a non-overlapping manner. In other words, SPs scheduled on Link1 are orthogonal in time with SPs scheduled on Link2. As shown in FIG. 9A, a first SP (SP1) is scheduled on Link1 between times $t_0$ and $t_1$, a second SP (SP2) is scheduled on Link2 between times $t_1$ and $t_2$, a third SP (SP3) is scheduled on Link1 between times $t_2$ and $t_3$, and a fourth SP (SP4) is scheduled on Link2 between times $t_3$ and $t_4$. In some implementations, the service periods SP1-SP4 may be individual SPs. In some other implementations, the service periods SP1-SP4 may be broadcast TWT SPs.

Still further, in some implementations, the service periods SP1-SP4 may be r-TWT SPs. In some aspects, the AP (of the AP MLD) and STA (of the non-AP MLD) associated with a given communication link may enter a power save mode (or "doze") outside of a scheduled SP. For example, the AP and STA associated with Link1 may doze between times $t_1$ and $t_2$ and between times $t_3$ and $t_4$ whereas the AP and STA associated with Link2 may doze between times $t_0$ and $t_1$ and between times $t_2$ and $t_3$.

The non-overlapping service periods SP1-SP4 may provide latency gains across multiple communication links Link1 and Link2 by increasing the frequency with which the AP MLD or the non-AP MLD can transmit latency-sensitive traffic. For example, any latency-sensitive traffic that becomes available between times $t_0$ and $t_1$ can be transmitted on Link1 (during SP1), any latency-sensitive traffic that becomes available between times $t_1$ and $t_2$ can be transmitted on Link2 (during SP2), any latency-sensitive traffic that becomes available between times $t_2$ and $t_3$ can be transmitted on Link1 (during SP3), and any latency-sensitive traffic that becomes available between times $t_3$ and $t_4$ can be transmitted on Link2 (during SP4). Accordingly, the non-overlapping service periods SP1-SP4 may be well-suited for sparse or aperiodic latency-sensitive traffic.

In the example of FIG. 9A, the end of each SP is shown to be aligned with the start of another SP. For example, time $t_1$ coincides with the end of SP1 and the start of SP2, time $t_2$ coincides with the end of SP2 and the start of SP3, and time $t_3$ coincides with the end of SP3 and the start of SP4. However, the SPs need not be aligned so closely in time. In some aspects, there may gaps in time between the end of an SP and the start of a new SP. During such gaps, the non-AP MLD (or the AP MLD) may enter a power save mode (or doze), for example, by turning off at least a portion of its modem circuitry (including one or more wireless radios).

Figure 9B:
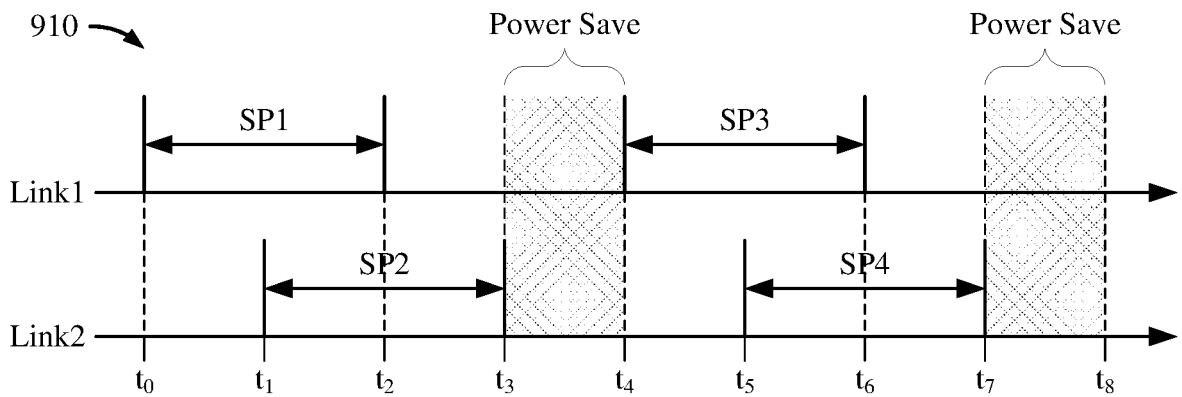

FIG. 9B shows a timing diagram 910 depicting an example TWT schedule shared by an AP MLD and a non-AP MLD. In some implementations, the AP MLD and the non-AP MLD may be examples of the AP MLD 510 and the non-AP MLD 520, respectively, of FIG. 5. As shown in FIG. 9B, the AP MLD is configured to communicate with the non-AP MLD via multiple communication links Link1 and Link2.

In some implementations, the AP MLD and the non-AP MLD may schedule SPs on the communication links Link1 and Link2 in a partially-overlapping manner. In other words, SPs scheduled on Link1 partially overlap in time with SPs scheduled on Link2. As shown in FIG. 9B, a first SP (SP1) is scheduled on Link1 between times $t_0$ and $t_2$, a second SP (SP2) is scheduled on Link2 between times $t_1$ and $t_3$, a third SP (SP3) is scheduled on Link1 between times $t_4$ and $t_6$, and a fourth SP (SP4) is scheduled on Link2 between times $t_5$ and $t_7$. In some implementations, the service periods SP1-SP4 may be individual SPs. In some other implementations, the service periods SP1-SP4 may be broadcast TWT SPs. Still further, in some implementations, the service periods SP1-SP4 may be r-TWT SPs. In some aspects, the AP (of the AP MLD) and STA (of the non-AP MLD) associated with a given communication link may enter a power save mode (or doze) outside of a scheduled SP. For example, the AP and STA associated with Link1 may doze between times $t_2$ and $t_4$ and between times $t_6$ and $t_8$ whereas the AP and STA associated with Link2 may doze before time $t_1$, between times $t_3$ and $t_5$, and after time $t_7$.

The partially-overlapping service periods SP1-SP4 may provide greater power savings, at the cost of some latency gains, by allowing the AP MLD and the non-AP MLD to turn off its modem circuitry (including one or more wireless radios) for certain periods of time. For example, each AP of the AP MLD and each STA of the non-AP MLD may concurrently doze between times $t_3$ and $t_4$ and between times $t_7$ and $t_8$. As such, each of the AP MLD and the non-AP MLD may turn off its modem circuitry between these periods to reduce power consumption. However, because the service periods SP1 and SP3 partially overlap the service periods SP2 and SP4, respectively, the AP MLD and non-AP MLD may still achieve improved latency gains (compared to SPs scheduled on a single communication link). Accordingly, the partially-overlapping service periods SP1-SP4 may balance the interests of power savings and latency gains.

Figure 9C:
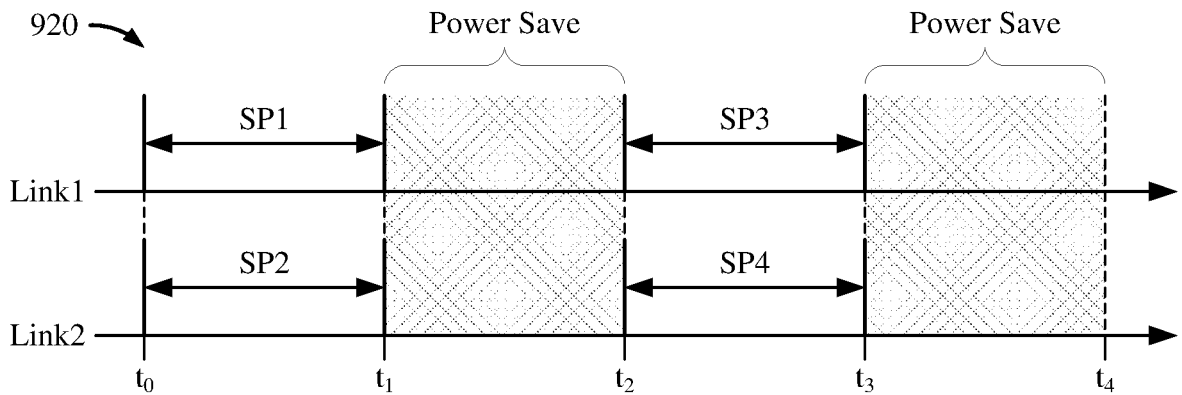

FIG. 9C shows a timing diagram 920 depicting an example TWT schedule shared by an AP MLD and a non-AP MLD. In some implementations, the AP MLD and the non-AP MLD may be examples of the AP MLD 510 and the non-AP MLD 520, respectively, of FIG. 5. As shown in FIG. 9C, the AP MLD is configured to communicate with the non-AP MLD via multiple communication links Link1 and Link2.

In some implementations, the AP MLD and the non-AP MLD may schedule SPs on the communication links Link1 and Link2 in an overlapping manner. In other words, SPs scheduled on Link1 fully overlap in time with SPs scheduled on Link2. As shown in FIG. 9C, a first SP (SP1) is scheduled on Link1 between times $t_0$ and $t_1$, a second SP (SP2) is scheduled on Link2 between times $t_0$ and $t_1$, a third SP (SP3) is scheduled on Link1 between times $t_2$ and $t_3$, and a fourth SP (SP4) is scheduled on Link2 between times $t_2$ and $t_3$. In some implementations, the service periods SP1-SP4 may be individual SPs. In some other implementations, the service periods SP1-SP4 may be broadcast TWT SPs. Still further, in some implementations, the service periods SP1-SP4 may be r-TWT SPs. In some aspects, the AP (of the AP MLD) and STA (of the non-AP MLD) associated with a given communication link may enter a power save mode (or doze) outside of a scheduled SP. For example, the AP and STA associated with Link1 may doze between times $t_1$ and $t_2$ and between times $t_3$ and $t_4$ while the AP and STA associated with Link2 also may doze between times $t_1$ and $t_2$ and between times $t_3$ and $t_4$.

The overlapping service periods SP1-SP4 may provide even greater power savings by allowing the AP MLD and the non-AP MLD to turn off its modem circuitry (including one or more wireless radios) for longer periods of time. For example, each AP of the AP MLD and each STA of the non-AP MLD may concurrently doze between times $t_1$ and $t_2$ and between times $t_3$ and $t_4$. As such, each of the AP MLD and the non-AP MLD may turn off its modem circuitry between these periods to reduce power consumption. Accordingly, the overlapping service periods SP1-SP4 may be well-suited for periodic or high-volume latency-sensitive traffic. In some aspects, the overlapping service periods SP1-SP4 may be unannounced SPs. An unannounced SP is any SP for which the AP MLD has prior knowledge that the non-AP MLD will be available. In some other aspects, the overlapping service periods SP1-SP4 may be announced SPs. An announced SP is any SP for which a non-AP MLD must announce its availability.

Aspects of the present disclosure recognize that additional considerations may be needed to support overlapping SPs and partially-overlapping SPs in certain modes of non-AP MLD operation. For example, a non-AP MLD operating in the MLMR STR mode has complete flexibility to transmit and receive on multiple communication links and may therefore benefit from overlapping SPs. By contrast, a non-AP MLD operating in the MLSR mode can transmit or receive on only one communication link at a time and therefore may not benefit from overlapping SPs. However, a non-AP MLD operating in the EMLSR mode can concurrently listen on multiple communication links (including the EMLSR links associated with the hybrid EMLSR mode) but can only transmit and receive on one link at a time. Similarly, a non-AP MLD operating in the EMLMR mode can concurrently listen on its EMLMR links but can only transmit and receive on one EMLMR link at a time.

Thus, a non-AP MLD operating in the EMLSR mode or the EMLMR mode may benefit from overlapping SPs under certain conditions and may not benefit from overlapping SPs under other conditions. In some aspects, an AP MLD may not schedule unannounced overlapping SPs for a non-AP MLD operating in the EMLSR mode or on the EMLMR links associated with a non-AP MLD operating in the EMLMR mode. For example, because the AP MLD must already have knowledge of the non-AP MLD's availability and because the non-AP MLD may not be able to receive frames simultaneously on multiple communication links, scheduling unannounced overlapping SPs may unnecessarily increase power consumption on at least one of the communication links. Thus, the AP MLD may only schedule unannounced SPs as non-overlapping SPs.

In some implementations, a non-AP MLD operating in the EMLSR mode may switch its wireless radios to operate on the link associated with an unannounced SP (rather than remain in a 1×1 listen mode) at the start of the SP, without first detecting an initial control frame (such as a BSRP or MU-RTS frame) on that link from the AP MLD. Similarly, an AP MLD may begin communicating with a non-AP MLD operating in the EMLSR mode at the start of an unannounced SP without first transmitting an initial control frame on the associated link. This may reduce the overhead or delay associated with switching the operation of the non-AP MLD from one communication link to another (such as, up to ~256 μs).

In some other implementations, a non-AP MLD operating in the EMLMR mode may switch the antennas shared among its EMLMR links to operate on the link associated with an unannounced SP at the start of the SP, without first detecting an initial frame or packet on that link from the AP MLD. Similarly, an AP MLD may begin communicating with a non-AP MLD operating in the EMLMR mode at the start of an unannounced SP without first transmitting an initial frame or packet using only a subset of available spatial streams. In other words, the AP MLD and non-AP MLD may leverage all available antennas shared by the EMLMR links for the entirety of the data exchange.

In some other aspects, an AP MLD may schedule announced overlapping SPs for a non-AP MLD operating in the EMLSR mode or on the EMLMR links associated with a non-AP MLD operating in the EMLMR mode. For example, because the non-AP MLD can concurrently listen for communications on multiple communication links, scheduling announced overlapping SPs may allow the AP MLD or the non-AP MLD to perform data exchanges during the overlapping SPs on an optimal communication link. In some implementations, the AP MLD may dynamically select the optimal communication link. In some other implementations, the non-AP MLD may dynamically select the optimal communication link.

Figure 10A:
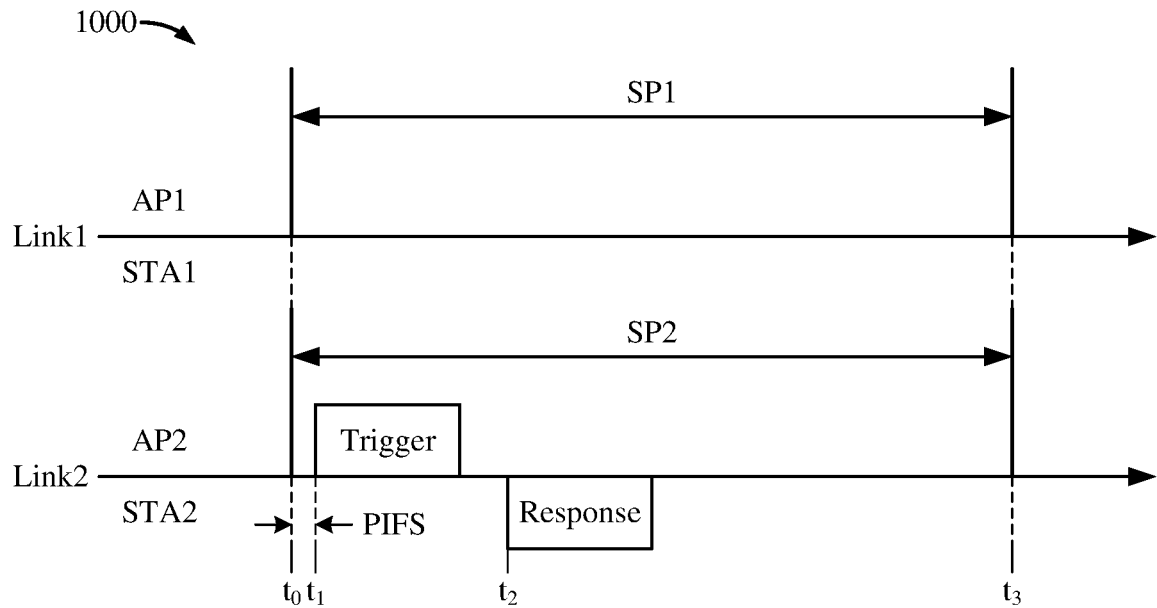
FIGS. 10A and 10B show timing diagrams depicting examples of wireless communication between an AP MLD and a non-AP MLD.

FIG. 10A shows a timing diagram 1000 depicting an example of wireless communication between an AP MLD and a non-AP MLD. In some implementations, the AP MLD and the non-AP MLD may be examples of the AP MLD 510 and the non-AP MLD 520, respectively, of FIG. 5. In the example of FIG. 10A, the AP MLD is shown to include access points AP1 and AP2 and the non-AP MLD is shown to include wireless stations STA1 and STA2. The AP MLD is configured to communicate with the non-AP MLD via multiple communication links Link1 and Link2. More specifically, AP1 and STA1 are configured to operate on Link1 whereas AP2 and STA2 are configured to operate on Link2.

In the example of FIG. 10A, overlapping service periods SP1 and SP2 are scheduled to occur on Link1 and Link2, respectively, from times $t_0$ to $t_3$. However, the non-AP MLD may only transmit or receive on one of the communication links Link1 or Link2 at any given time. In some implementations, the non-AP MLD may be configured to operate in the EMLSR mode. In some other implementations, the non-AP MLD may be configured to operate in the hybrid EMLSR mode. In such implementations, Link1 and Link2 may be EMLSR links. Still further, in some implementations, the non-AP MLD may be configured to operate in the EMLMR mode. In such implementations, Link1 and Link2 may be EMLMR links.

In some aspects, the AP MLD may select one of the communication links Link1 or Link2 to be used for data exchanges during the overlapping service periods SP1 and SP2 based on one or more channel conditions associated with each of the communication links Link1 and Link2. As described herein, example suitable channel conditions may include, among other examples, a level of interference (such as from an OBSS), a bandwidth of the channel, and an MCS used for communications. For example, the AP MLD may perform a channel comparison operation that compares the channel conditions associated with Link1 and Link2 and indicates which of the communication links has the superior (or more favorable) channel conditions. In some implementations, the AP MLD may transmit a trigger frame on the communication link indicated to have superior channel conditions.

In the example of FIG. 10A, the AP MLD transmits a trigger frame on Link2 at time $t_1$. In some implementations, the AP MLD may transmit the trigger frame within a point coordination function (PCF) interframe space (PIFS) duration following the start of the overlapping SPs. At time $t_2$, the non-AP MLD transmits a response frame on Link2 indicating its availability to communicate on the selected link. In some implementations, the trigger frame may be a BSRP frame and the response frame may be a BSR frame (with a PM bit set to "0"). For example, the AP MLD may transmit the BSRP frame when the non-AP MLD is configured to operate in the EMLSR or hybrid EMLSR mode. In some other implementations, the trigger frame may be a trigger frame and the response frame may be a TB PPDU. For example, the AP MLD may transmit the trigger frame when the non-AP MLD is configured to operate in the EMLMR mode. This allows the non-AP MLD to pool the antennas shared by its EMLMR links (such as Link1 and Link2) to operate on Link2 at the start of the transmission of the TB PPDU.

Figure 10B:
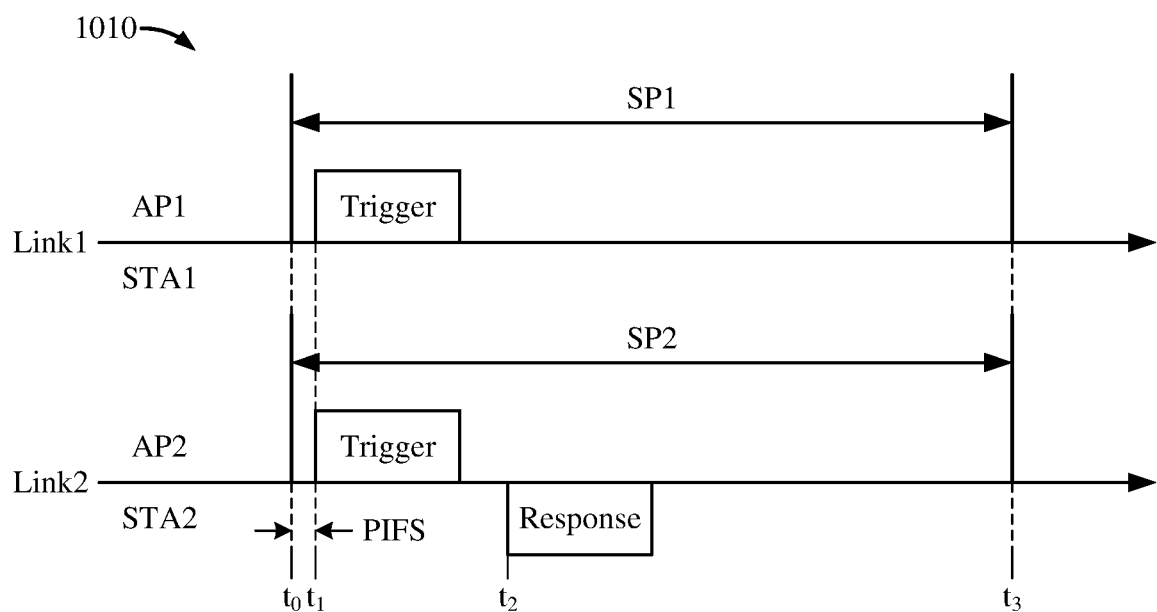

FIG. 10B shows a timing diagram 1010 depicting an example of wireless communication between an AP MLD and a non-AP MLD. In some implementations, the AP MLD and the non-AP MLD may be examples of the AP MLD 510 and the non-AP MLD 520, respectively, of FIG. 5. In the example of FIG. 10B, the AP MLD is shown to include access points AP1 and AP2 and the non-AP MLD is shown to include wireless stations STA1 and STA2. The AP MLD is configured to communicate with the non-AP MLD via multiple communication links Link1 and Link2. More specifically, AP1 and STA1 are configured to operate on Link1 whereas AP2 and STA2 are configured to operate on Link2.

In the example of FIG. 10B, overlapping service periods SP1 and SP2 are scheduled to occur on Link1 and Link2, respectively, from times $t_0$ to $t_3$. However, the non-AP MLD may only transmit or receive on one of the communication links Link1 or Link2 at any given time. In some implementations, the non-AP MLD may be configured to operate in the EMLSR mode. In some other implementations, the non-AP MLD may be configured to operate in the hybrid EMLSR mode. In such implementations, Link1 and Link2 may be EMLSR links. Still further, in some implementations, the non-AP MLD may be configured to operate in the EMLMR mode. In such implementations, Link1 and Link2 may be EMLMR links. In some aspects, the AP MLD may transmit a respective trigger frame on each of the communication links Link1 and Link2 at time $t_1$. In some implementations, the AP MLD may transmit the trigger frames within a PIFS duration following the start of the overlapping SPs.

In some aspects, the non-AP MLD may select one of the communication links Link1 or Link2 to be used for data exchanges during the overlapping service periods SP1 and SP2 based on one or more channel conditions associated with each of the communication links Link1 and Link2. As described herein, example suitable channel conditions may include, among other examples, a level of interference (such as from an OBSS), a bandwidth of the channel, and an MCS used for communications. For example, the non-AP MLD may perform a channel comparison operation that compares the channel conditions associated with Link1 and Link2 and indicates which of the communication links has the superior (or more favorable) channel conditions. In some implementations, the non-AP MLD may transmit a response frame on the communication link indicated to have superior channel conditions.

In the example of FIG. 10B, the non-AP MLD transmits a response frame on Link2, at time $t_2$, indicating its availability to communicate on the selected link. In some implementations, the trigger frame may be a BSRP frame and the response frame may be a BSR frame (with a PM bit set to "0"). For example, the AP MLD may transmit the BSRP frame when the non-AP MLD is configured to operate in the EMLSR or hybrid EMLSR mode. In some other implementations, the trigger frame may be a trigger frame and the response frame may be a TB PPDU. For example, the AP MLD may transmit the trigger frame when the non-AP MLD is configured to operate in the EMLMR mode. This allows the non-AP MLD to pool the antennas shared by its EMLMR links (such as Link1 and Link2) to operate on Link2 at the start of the transmission of the TB PPDU.

Figure 11A:
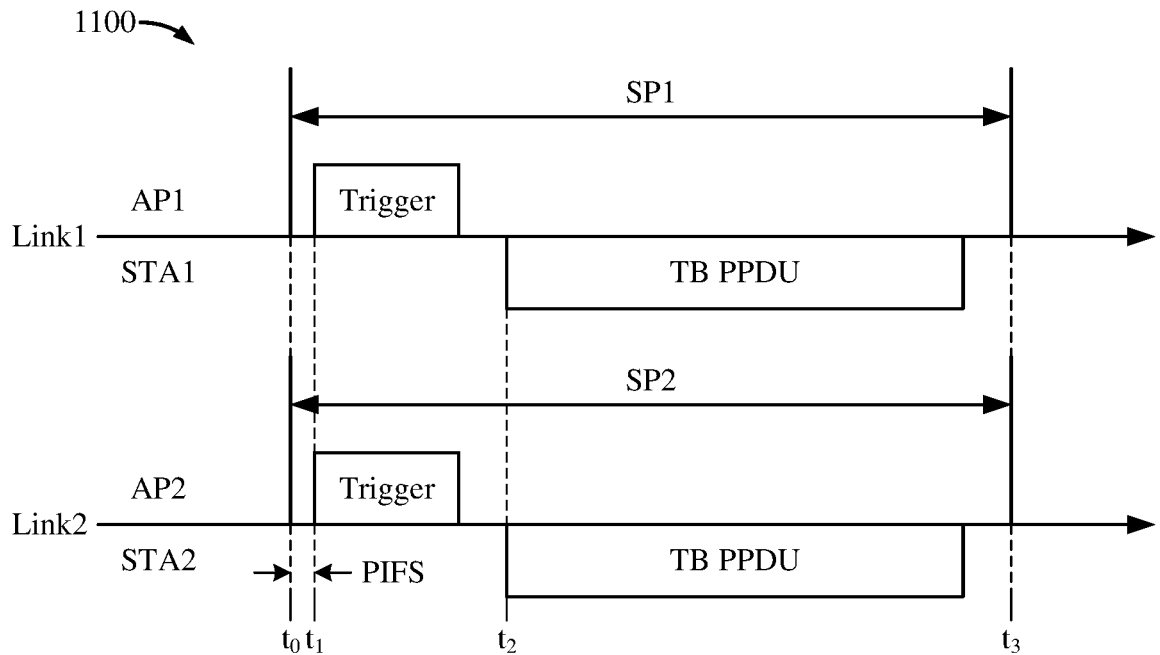
FIGS. 11A and 11B show timing diagrams depicting examples of wireless communication between an AP MLD and a non-AP MLD.

FIG. 11A shows a timing diagram 1100 depicting an example of wireless communication between an AP MLD and a non-AP MLD. In some implementations, the AP MLD and the non-AP MLD may be examples of the AP MLD 510 and the non-AP MLD 520, respectively, of FIG. 5. In the example of FIG. 11A, the AP MLD is shown to include access points AP1 and AP2 and the non-AP MLD is shown to include wireless stations STA1 and STA2. The AP MLD is configured to communicate with the non-AP MLD via multiple communication links Link1 and Link2. More specifically, AP1 and STA1 are configured to operate on Link1 whereas AP2 and STA2 are configured to operate on Link2.

In the example of FIG. 11A, overlapping service periods SP1 and SP2 are scheduled to occur on Link1 and Link2, respectively, from times $t_0$ to $t_3$. However, the non-AP MLD may concurrently transmit and receive on the communication links Link1 or Link2 in a synchronous manner only. In other words, the non-AP MLD may concurrently transmit on Link1 and Link2 and may concurrently receive on Link1 and Link2 but may not transmit on one of the communication links (such as Link1) while receiving on the other communication link (such as Link2). In some implementations, the non-AP MLD may be configured to operate in the MLMR NSTR mode.

Because STA1 and STA2 must individually contend for access on Link1 and Link2, respectively, the random backoff (RBO) determined for one of the links may be different than the RBO determined for the other link. Existing versions of the IEEE 802.11 provide a mechanism by which a non-AP MLD can align the start times of data transmission on multiple links by extending the RBO on one of the links to match the longer RBO on the other link. However, aspects of the present disclosure recognize that delaying the transmission on one of the links may allow another device to gain access to the channel in the interim. Thus, the existing mechanisms for aligning transmissions across multiple links may not be suitable for latency-sensitive traffic.

In some aspects, the AP MLD may align the start times of UL transmissions across multiple links by soliciting the UL transmissions, concurrently, using trigger frames. Aspects of the present disclosure recognize that, unlike non-AP MLDs, AP MLDs can aggressively access a wireless channel without having to wait an RBO duration. As such, an AP MLD may align the transmissions of its trigger frames on multiple links using existing channel access mechanisms. As shown in FIG. 11A, the AP MLD transmits a respective trigger frame on each of the communication links Link1 and Link2 at time $t_1$. In some implementations, the AP MLD may transmit the trigger frames within a PIFS duration following the start of the overlapping SPs. At time $t_2$, the non-AP MLD responds to the trigger frames by transmitting a respective TB PPDU on each of the communication links Link1 and Link2.

Figure 11B:
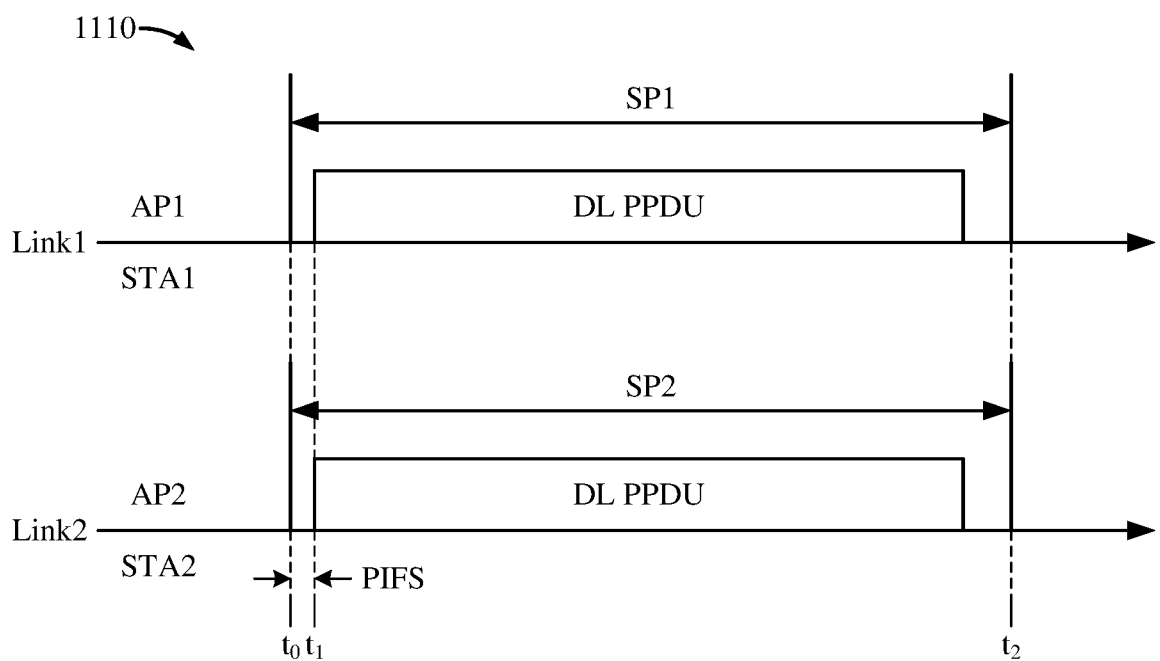

FIG. 11B shows a timing diagram 1110 depicting an example of wireless communication between an AP MLD and a non-AP MLD. In some implementations, the AP MLD and the non-AP MLD may be examples of the AP MLD 510 and the non-AP MLD 520, respectively, of FIG. 5. In the example of FIG. 11B, the AP MLD is shown to include access points AP1 and AP2 and the non-AP MLD is shown to include wireless stations STA1 and STA2. The AP MLD is configured to communicate with the non-AP MLD via multiple communication links Link1 and Link2. More specifically, AP1 and STA1 are configured to operate on Link1 whereas AP2 and STA2 are configured to operate on Link2.

In the example of FIG. 11B, overlapping service periods SP1 and SP2 are scheduled to occur on Link1 and Link2, respectively, from times $t_0$ to $t_3$. However, the non-AP MLD may concurrently transmit and receive on the communication links Link1 or Link2 in a synchronous manner only. In other words, the non-AP MLD may concurrently transmit on Link1 and Link2 and may concurrently receive on Link1 and Link2 but may not transmit on one of the communication links (such as Link1) while receiving on the other communication link (such as Link2). In some implementations, the non-AP MLD may be configured to operate in the MLMR NSTR mode.

In some aspects, the AP MLD may align the start times of DL transmissions across multiple links. As described herein, AP MLDs can aggressively access a wireless channel without having to wait an RBO duration. As such, an AP MLD may align the transmissions of DL packets on multiple links using existing channel access mechanisms. As shown in FIG. 11B, the AP MLD initiates a respective DL transmission on each of the communication links Link1 and Link2 at time $t_1$. In some implementations, the AP MLD may initiate the DL transmissions within a PIFS duration following the start of the overlapping SPs.

Aspects of the present disclosure recognize that an AP MLD may further delete a communication link or suspend operation thereon. Accordingly, an AP MLD may transfer a TWT session (including one or more SPs) set up on a to-be-deleted (or to-be-suspended) link to another communication link. In some implementations, the AP MLD may establish the TWT session on multiple communication links even if only one of the links are used for data exchanges. However, this may result in significant overhead or power consumption. In some other implementations, the AP MLD may first tear down the TWT session on the link to be deleted (or suspended) and may subsequently re-establish the TWT session (by setting up a new TWT session) on another communication link. However, this may result in a disruption to the quality of service. In some aspects, the AP MLD may dynamically transfer the TWT session from the link to be deleted (or suspended) to another communication link in a manner that reduces sign and disruption in service.

Figure 12A:
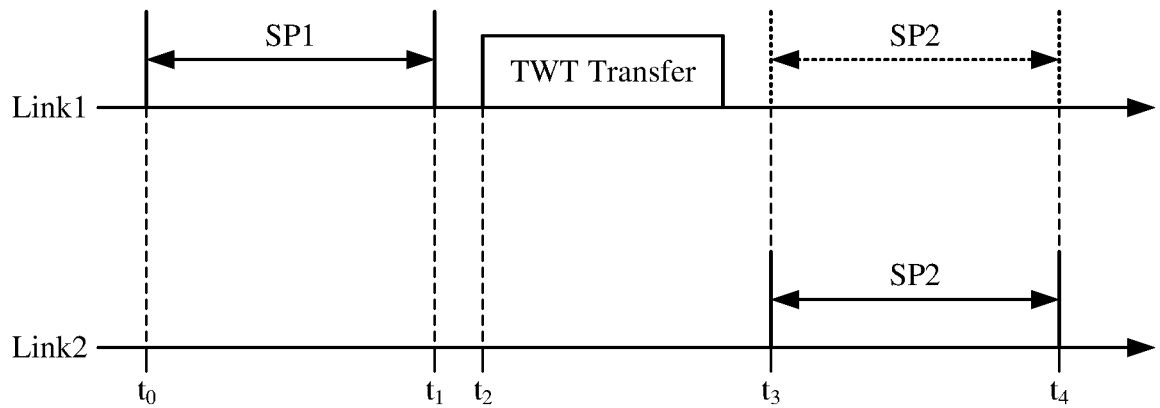
FIGS. 12A and 12B show timing diagrams depicting examples of wireless communication between an AP MLD and a non-AP MLD.

FIG. 12A shows a timing diagram 1200 depicting an example of wireless communication between an AP MLD and a non-AP MLD. In some implementations, the AP MLD and the non-AP MLD may be examples of the AP MLD 510 and the non-AP MLD 520, respectively, of FIG. 5. As shown in FIG. 12A, the AP MLD is configured to communicate with the non-AP MLD via multiple communication links Link1 and Link2.

In the example of FIG. 12A, a TWT session is initially set up on Link1. For example, the TWT session may be associated with a first SP (SP1), between times $t_0$ and $t_1$, and a second SP (SP2), between times $t_3$ and $t_4$. The service periods SP1 and SP2 may be r-TWT SPs, individual TWT SPs, or broadcast TWT SPs. In some aspects, a TWT transfer is initiated at time $t_2$ to transfer the TWT session from Link1 to Link2. In some implementations, the AP MLD may initiate the TWT transfer by transmitting TWT transfer information, at time $t_2$, on Link1. For example, such TWT transfer information may signal that a (unsolicited) TWT agreement associated with the TWT session is being transferred from Link1 to Link2. In some other implementations, the non-AP MLD may initiate the TWT transfer by transmitting TWT transfer information, at time $t_2$, on Link1. For example, such TWT transfer information may signal a request to transfer a TWT agreement associated with the TWT session from Link1 to Link2.

As a result of the TWT transfer, SP2 may occur on Link2 (between times $t_3$ and $t_4$) rather than Link1. For example, the AP MLD may transmit beacon frames on Link2 carrying TWT schedule information indicating the schedule associated with SP2. In some implementations, one or more TWT parameters associated with SP2 may be different than respective TWT parameters associated with SP1. For example, the TWT parameters may be adjusted based on differences in the properties (such as available bandwidth) of Link1 and Link2. In some implementations, the TWT transfer information may include tunneling information that identifies the destination link for the TWT transfer. For example, the tunneling information may be carried in the third address field (Address 3) of the MAC header of a TWT information frame or in a Link ID field in the frame body of the TWT information frame. In some other implementations, the TWT transfer information may include a bitmap that indicates which communication link(s) the TWT transfer information applies to. For example, the bitmap may be carried in a new information element of a TWT information frame.

Figure 12B:
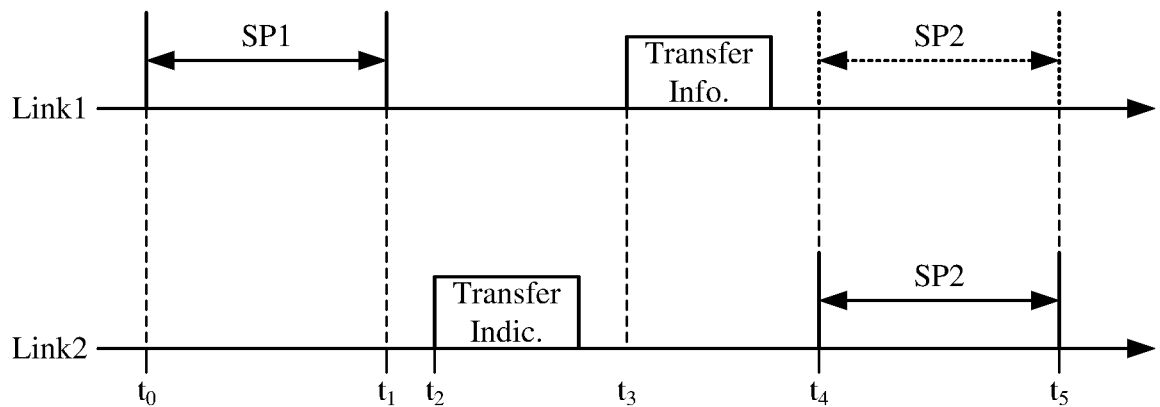

FIG. 12B shows a timing diagram 1210 depicting an example of wireless communication between an AP MLD and a non-AP MLD. In some implementations, the AP MLD and the non-AP MLD may be examples of the AP MLD 510 and the non-AP MLD 520, respectively, of FIG. 5. As shown in FIG. 12B, the AP MLD is configured to communicate with the non-AP MLD via multiple communication links Link1 and Link2.

In the example of FIG. 12B, a TWT session is initially set up on Link1. For example, the TWT session may be associated with a first SP (SP1), between times $t_0$ and $t_1$, and a second SP (SP2), between times $t_4$ and $t_5$. The service periods SP1 and SP2 may be r-TWT SPs, individual TWT SPs, or broadcast TWT SPs. In some aspects, a TWT transfer is initiated at time $t_2$ to transfer the TWT session from Link1 to Link2. In some implementations, the AP MLD may initiate the TWT transfer by transmitting a TWT transfer indication, at time $t_2$, on Link2. For example, such TWT transfer indication may signal that a (unsolicited) TWT agreement is being transferred to Link2. In some other implementations, the non-AP MLD may initiate the TWT transfer by transmitting a TWT transfer indication, at time $t_2$, on Link2. For example, such TWT transfer indication may signal a request to transfer a TWT agreement to Link2.

In some aspects, the TWT transfer indication may signal the receiving device (such as the AP MLD or the non-AP MLD) to retrieve addition TWT transfer information on Link1. For example, the device initiating the TWT transfer may further transmit TWT transfer information, at time $t_3$, on Link1. In some implementations, the TWT transfer indication may be included with critical update information carried in one or more beacon frames transmitted by the AP MLD on Link2. The critical update information notifies the non-AP MLD to retrieve additional information on Link1. For example, the non-AP MLD may retrieve the transfer information from one or more beacon or probe response frames transmitted on Link1. The TWT transfer information may indicate that a TWT agreement associated with the TWT session on Link1 is to be transferred. However, because the TWT transfer indication was transmitted on Link2, the TWT transfer information may not indicate the destination link. In other words, the receiving device already knows that Link2 is the destination link associated with the TWT transfer.

As a result of the TWT transfer, SP2 may occur on Link2 (between times $t_4$ and $t_5$) rather than Link1. For example, the AP MLD may transmit beacon frames on Link2 carrying TWT schedule information indicating the schedule associated with SP2. In some implementations, one or more TWT parameters associated with SP2 may be different than respective TWT parameters associated with SP1. For example, the TWT parameters may be adjusted based on differences in the properties (such as available bandwidth) of Link1 and Link2.

Figure 13:
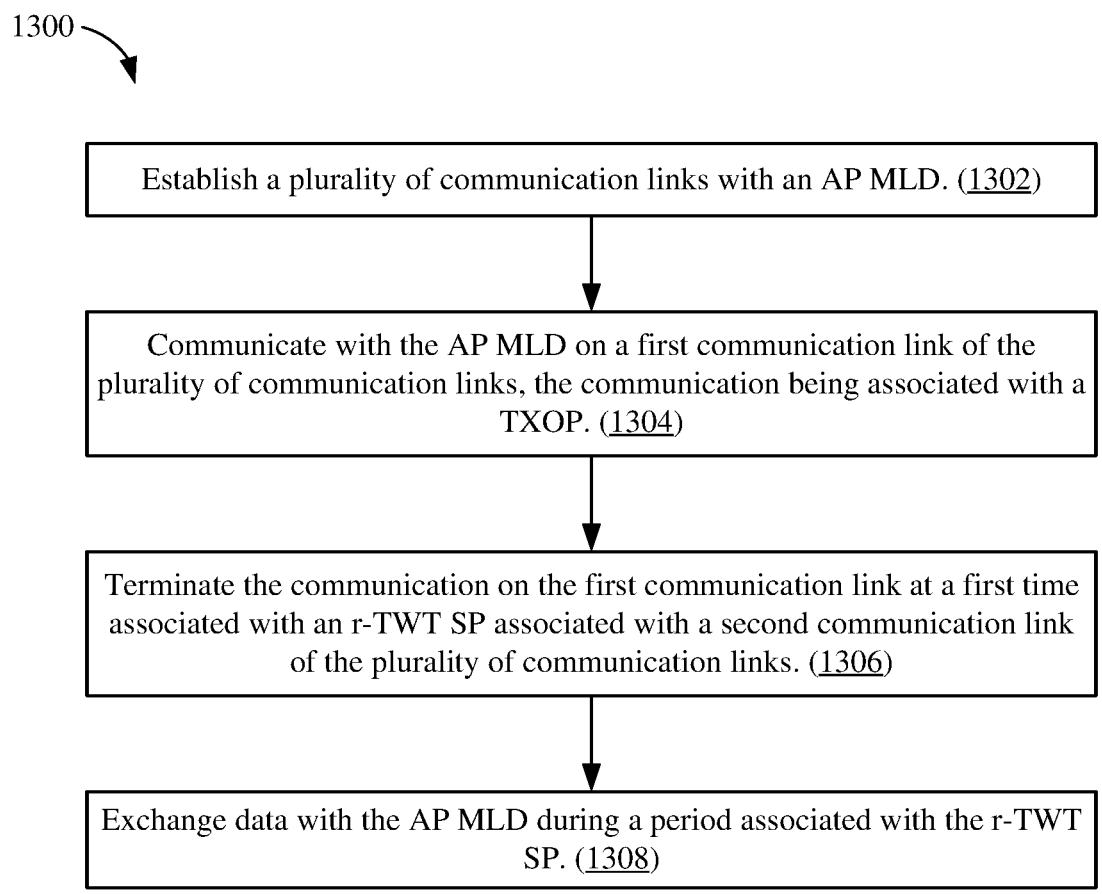
FIG. 13 shows an illustrative flowchart depicting an example wireless communication operation.

FIG. 13 shows an illustrative flowchart depicting an example wireless communication operation 1300. The example operation 1300 may be performed by a wireless communication device such as the non-AP MLD 520 of FIG. 5.

The wireless communication device establishes a plurality of communication links with an AP MLD (1302). The wireless communication device communicates with the AP MLD on a first communication link of the plurality of communication links, where the communication is associated with a TXOP (1304). The wireless communication device terminates the communication on the first communication link at a first time associated with an r-TWT SP associated with a second communication link of the plurality of communication links (1306). The wireless communication device further exchanges data with the AP MLD during a period associated with the r-TWT SP (1308).

In some aspects, the first time may occur after the start of the r-TWT SP and the data may be exchanged on the first communication link during the TXOP. In some implementations, the wireless communication device may exchange the data with the AP MLD by performing a channel comparison operation that indicates which of the first communication link or the second communication link is associated with superior channel conditions, where the data is exchanged on the first communication link responsive to the channel comparison operation indicating that the first communication link is associated with superior channel conditions.

In some other aspects, the first time may occur prior to the start of the r-TWT SP and the data may be exchanged on the second communication link during the r-TWT SP. In some implementations, the first time may precede the start of the r-TWT SP by a duration greater than or equal to a transition delay associated with transitioning a wireless radio from operating on the first communication link to operating on the second communication link in accordance with an MLSR mode of non-AP MLD operation, where the transition delay includes a delay associated with transmitting power management information indicating that a STA operating on the first communication link is entering a power save mode.

In some other implementations, the first time may precede the start of the r-TWT SP by a duration greater than or equal to a transition delay associated with transitioning a wireless radio from a transmitting or receiving state to a listening state in accordance with an EMLSR mode of non-AP MLD operation. Still further, in some implementations, the first time may precede the start of the r-TWT SP by a duration greater than or equal to a switchback delay associated with switching one or more antennas from operating on the first communication link to operating on the second communication link in accordance with an EMLMR mode of non-AP MLD operation.

In some aspects, the wireless communication device may communicate with the AP MLD on the first communication link by receiving a control frame from the AP MLD soliciting a response on the first communication link, performing a channel comparison operation that indicates which of the first communication link or the second communication link is associated with superior channel conditions, and refraining from responding to the control frame responsive to the channel comparison operation indicating that the second communication link is associated with superior channel conditions.

In some other aspects, the wireless communication device may communicate with the AP MLD on the first communication link by receiving, at a second time, a control frame from the AP MLD soliciting a response on the first communication link, performing a timing measurement operation that indicates a delay between the second time and the start of the r-TWT SP, and refraining from responding to the control frame responsive to the timing measurement operation indicating that the delay is less than a threshold duration.

Still further, in some aspects, the wireless communication device may communicate with the AP MLD on the first communication link by receiving, at a second time, a control frame from the AP MLD soliciting a response on the first communication link, performing a timing measurement operation that indicates a delay between the second time and the start of the r-TWT SP, and transmitting, to the AP MLD, information indicating that the wireless communication device is available on the first communication link only between the second time and the first time responsive to the timing measurement operation indicating that the delay is greater than or equal to a threshold duration.

In some aspects, the wireless communication device may terminate the communication on the first communication link by transmitting, on the first communication link, power management information indicating that a STA associated with the first communication link is entering a power save mode. In some implementations, the power management information may be carried in an MPDU transmitted to the AP MLD during the TXOP. In some other implementations, the power management information may be carried in a control frame transmitted to the AP MLD responsive to one or more MPDUs received on the first communication link during the TXOP.

Figure 14:
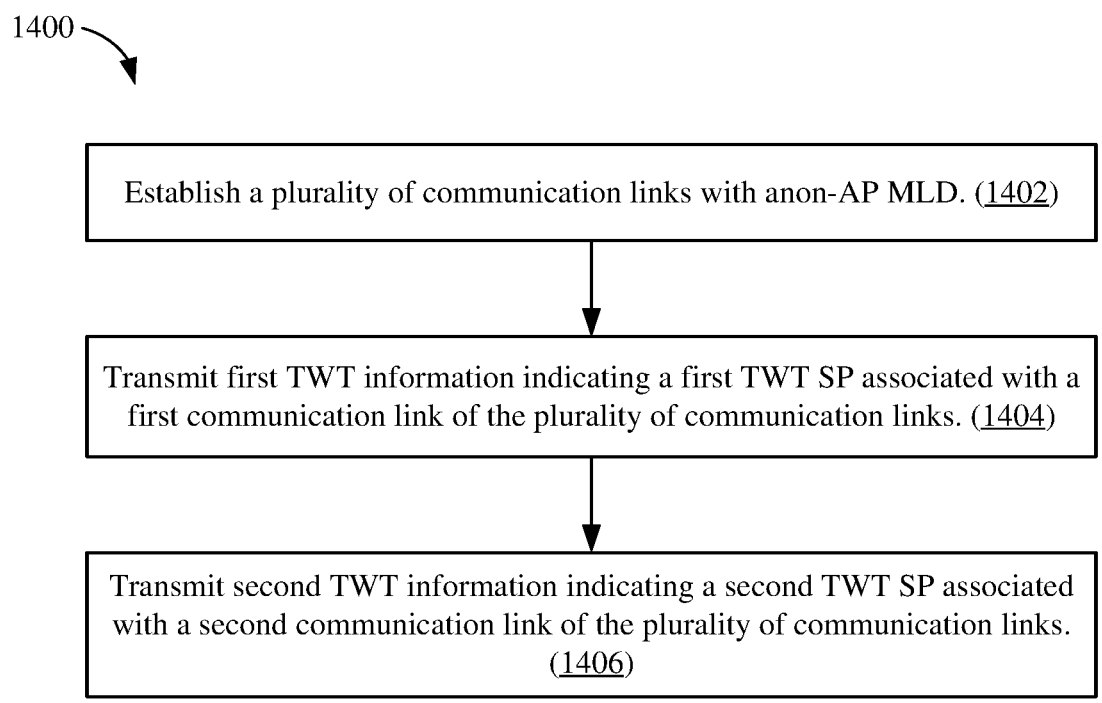
FIG. 14 shows an illustrative flowchart depicting an example wireless communication operation.

FIG. 14 shows an illustrative flowchart depicting an example wireless communication operation 1400. The example operation 1400 may be performed by a wireless communication device such as the AP MLD 510 of FIG. 5.

The wireless communication device establishes a plurality of communication links with a non-AP MLD (1402). The wireless communication device transmits first TWT information indicating a first TWT SP associated with a first communication link of the plurality of communication links (1404). The wireless communication device further transmits second TWT information indicating a second TWT SP associated with a second communication link of the plurality of communication links (1406).

In some aspects, the first TWT SP and the second TWT SP may be orthogonal in time. In some implementations, the non-AP MLD may operate in an EMLSR mode or an EMLMR mode of non-AP MLD operation. In such implementations, the wireless communication device may further exchange data packets with the non-AP MLD on the first communication link during the first TWT SP without transmitting an initial packet on the first communication link between the start of the first TWT SP and the start of the exchange, where the initial packet is different than the data packets.

In some other aspects, the first TWT SP may at least partially overlap the second TWT SP in time. In some implementations, the wireless communication device may further perform a channel comparison operation that indicates which of the first communication link or the second communication link is associated with superior channel conditions and transmit, on the first communication link, a control frame soliciting a response from the non-AP MLD during the first TWT SP responsive to the channel comparison operation indicating that the first communication link is associated with superior channel conditions. In some implementations, the control frame may be a trigger frame.

In some other implementations, the wireless communication device may transmit, on the first communication link, a first control frame soliciting a first response from the non-AP MLD during the first TWT SP and transmit, on the second communication link, a second control frame soliciting a second response from the non-AP MLD during the second TWT SP. In some implementations, the first control frame and the second control frame may be transmitted concurrently. In some implementations, the first control frame may be transmitted within a PIFS duration following the start of the first TWT SP and the second control frame may be transmitted within a PIFS duration following the start of the second TWT SP.

In some implementations, the wireless communication device may further receive, on the first communication link, a response to the first control frame indicating that the first communication link is associated with superior channel conditions compared to the second communication link, and communicate with the non-AP MLD exclusively on the first communication link during the first TWT SP and the second TWT SP.

In some other implementations, the wireless communication device may transmit a first PPDU on the first communication link during the first TWT SP and transmit a second PPDU on the second communication link during the second TWT SP, where the first and second PPDUs are transmitted concurrently. In some implementations, the first PPDU may be transmitted within a PIFS duration following the start of the first TWT SP and the second PPDU may be transmitted within a PIFS duration following the start of the second TWT SP.

In some other aspects, the second TWT information may be associated with a transfer of a TWT agreement from the first communication link to the second communication link.

Figure 15:
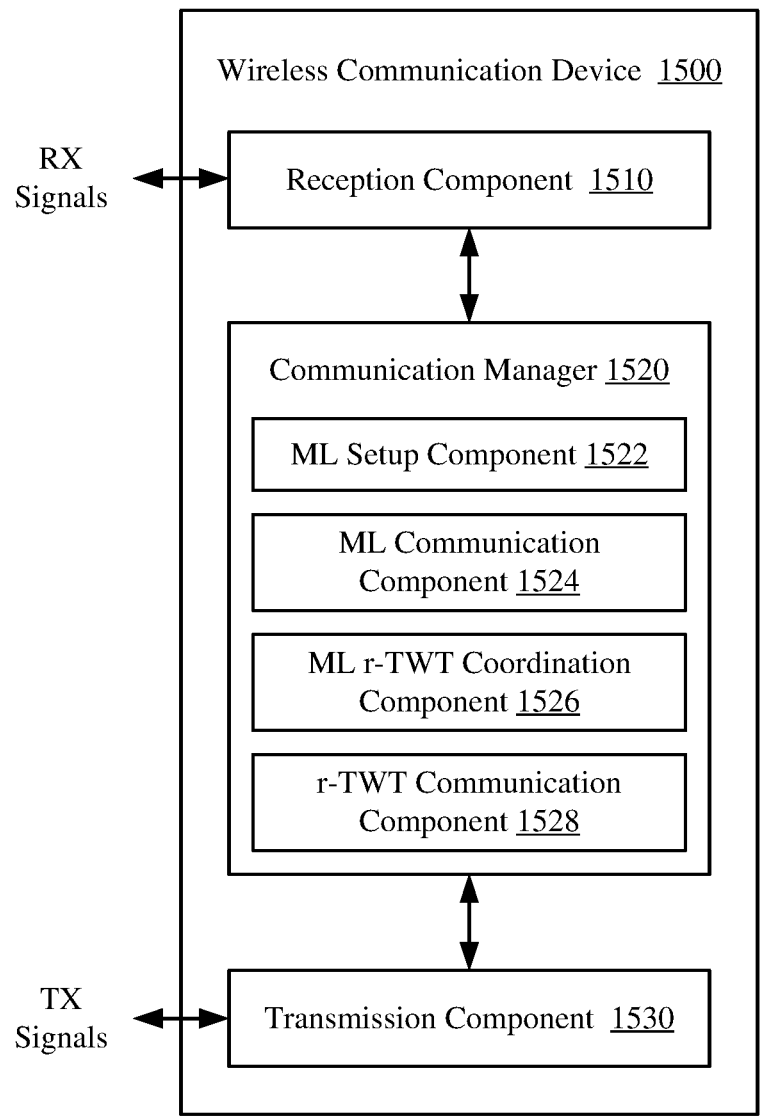
FIG. 15 shows a block diagram of an example wireless communication device.

FIG. 15 shows a block diagram of an example wireless communication device 1500. In some implementations, the wireless communication device 1500 may be configured to perform the operation 1300 described with reference to FIG. 13. The wireless communication device 1500 can be an example implementation of any of the STAs 120a-120i of FIG. 1, the STA 200 of FIG. 2, or the non-AP MLD 520 of FIG. 5. More specifically, the wireless communication device 1500 can be a chip, SoC, chipset, package or device that includes at least one processor and at least one modem (for example, a Wi-Fi (IEEE 802.11) modem or a cellular modem).

The wireless communication device 1500 includes a reception component 1510, a communication manager 1520, and a transmission component 1530. The communication manager 1520 further includes a multi-link (ML) setup component 1522, an ML communication component 1524, an ML r-TWT coordination component 1524, and an r-TWT communication component 1528. Portions of one or more of the components 1522-1528 may be implemented at least in part in hardware or firmware. In some implementations, one or more of the components 1522-1528 are implemented at least in part as software stored in a memory (such as the memory 240 of FIG. 2 or the memory 330 of FIG. 3). For example, portions of one or more of the components 1522-1528 can be implemented as non-transitory instructions (or "code") executable by a processor (such as the processor 320 of FIG. 3) to perform the functions or operations of the respective component.

The reception component 1510 is configured to receive RX signals from one or more other wireless communication devices and the transmission component 1530 is configured to transmit TX signals to one or more other wireless communication devices. The communication manager 1520 is configured to manage wireless communications with one or more other wireless communication devices. In some implementations, the ML setup component 1522 may establish a plurality of communication links with an AP MLD; the ML communication component 1524 may communicate with the AP MLD on a first communication link of the plurality of communication links, where the communication is associated with a TXOP; the ML r-TWT coordination component 1526 may terminate the communication on the first communication link at a first time associated with an r-TWT SP associated with a second communication link of the plurality of communication links; and the r-TWT communication component 1528 may exchange data with the AP MLD during a period associated with the r-TWT SP.

Figure 16:
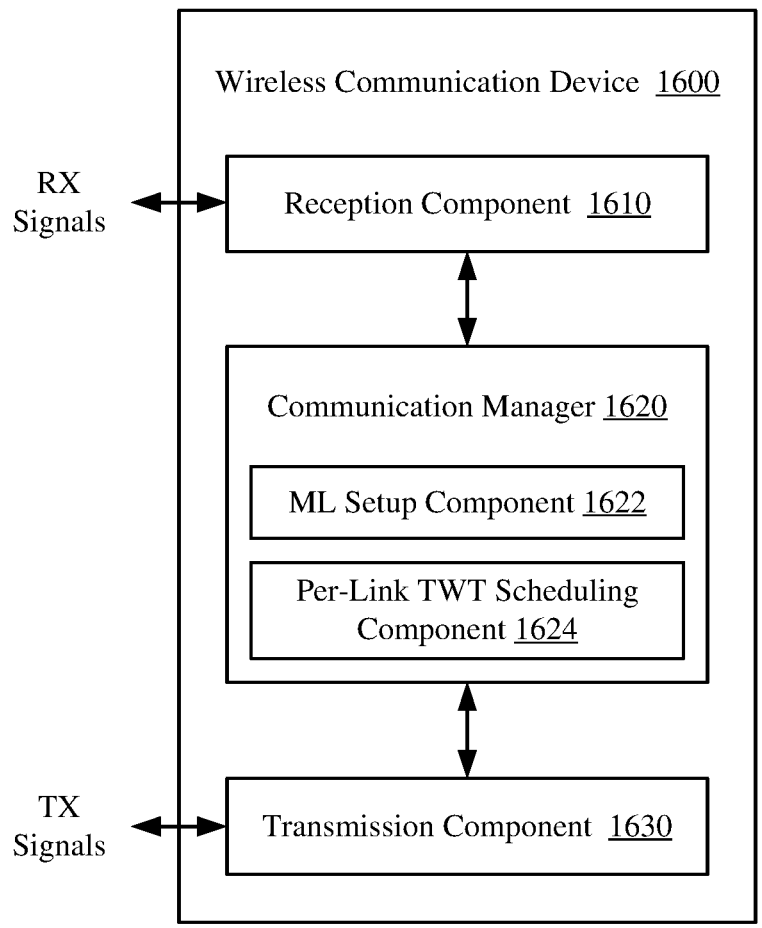
FIG. 16 shows a block diagram of an example wireless communication device.

FIG. 16 shows a block diagram of an example wireless communication device 1600. In some implementations, the wireless communication device 1600 may be configured to perform the operation 1400 described with reference to FIG. 14. The wireless communication device 1600 can be an example implementation of any of the APs 110 or 300 of FIGS. 1 and 3, respectively, or the AP MLD 510 of FIG. 5. More specifically, the wireless communication device 1600 can be a chip, SoC, chipset, package or device that includes at least one processor and at least one modem (for example, a Wi-Fi (IEEE 802.11) modem or a cellular modem).

The wireless communication device 1600 includes a reception component 1610, a communication manager 1620, and a transmission component 1630. The communication manager 1620 further includes a multi-link (ML) setup component 1622 and a per-link TWT scheduling component 1624. Portions of one or more of the components 1622 or 1624 may be implemented at least in part in hardware or firmware. In some implementations, one or more of the components 1622 or 1624 are implemented at least in part as software stored in a memory (such as the memory 240 of FIG. 2 or the memory 330 of FIG. 3). For example, portions of one or more of the components 1622 or 1624 can be implemented as non-transitory instructions (or "code") executable by a processor (such as the processor 320 of FIG. 3) to perform the functions or operations of the respective component.

The reception component 1610 is configured to receive RX signals from one or more other wireless communication devices and the transmission component 1630 is configured to transmit TX signals to one or more other wireless communication devices. The communication manager 1620 is configured to manage wireless communications with one or more other wireless communication devices. In some implementations, the ML setup component 1622 may establish a plurality of communication links with a non-AP MLD; the per-link TWT scheduling component 1624 may transmit first TWT information indicating a first TWT SP associated with a first communication link of the plurality of communication links; and the per-link TWT scheduling component 1624 may further transmit second TWT information indicating a second TWT SP associated with a second communication link of the plurality of communication links.

Implementation examples are described in the following numbered clauses:

1. A method for wireless communication by a wireless communication device, including:
   establishing a plurality of communication links with an access point (AP) multi-link device (MLD);
   communicating with the AP MLD on a first communication link of the plurality of communication links, the communication being associated with a transmit opportunity (TXOP); and
   terminating the communication on the first communication link at a first time associated with a restricted target wake time (r-TWT) service period (SP) associated with a second communication link of the plurality of communication links; and
   exchanging data with the AP MLD during a period associated with the r-TWT SP.

2. The method of clause 1, where the first time occurs after the start of the r-TWT SP and the data is exchanged on the first communication link during the TXOP.

3. The method of any of clauses 1 or 2, where the exchanging of the data includes:

performing a channel comparison operation that indicates which of the first communication link or the second communication link is associated with superior channel conditions, the data being exchanged on the first communication link responsive to the channel comparison operation indicating that the first communication link is associated with superior channel conditions.

4. The method of any of clause 1, where the first time occurs prior to the start of the r-TWT SP and the data is exchanged on the second communication link during the r-TWT SP.

5. The method of any of clauses 1 or 4, where the first time precedes the start of the r-TWT SP by a duration greater than or equal to a transition delay associated with transitioning a wireless radio from operating on the first communication link to operating on the second communication link in accordance with a multi-link single-radio (MLSR) mode of non-AP MLD operation, the transition delay including a delay associated with transmitting power management information indicating that a wireless station (STA) operating on the first communication link is entering a power save mode.

6. The method of any of clauses 1 or 4, where the first time precedes the start of the r-TWT SP by a duration greater than or equal to a transition delay associated with transitioning a wireless radio from a transmitting or receiving state to a listening state in accordance with an enhanced multi-link single-radio (EMLSR) mode of non-AP MLD operation.

7. The method of any of clauses 1 or 4, where the first time precedes the start of the r-TWT SP by a duration greater than or equal to a switchback delay associated with switching one or more antennas from operating on the first communication link to operating on the second communication link in accordance with an enhanced multi-link multi-radio (EMLMR) mode of non-AP MLD operation.

8. The method of any of clauses 1-7, where the communicating with the AP MLD on the first communication link includes:

receiving a control frame from the AP MLD soliciting a response on the first communication link;

performing a channel comparison operation that indicates which of the first communication link or the second communication link is associated with superior channel conditions; and refraining from responding to the control frame responsive to the channel comparison operation indicating that the second communication link is associated with superior channel conditions.

9. The method of any of clauses 1-7, where the communicating with the AP MLD on the first communication link includes:

receiving, at a second time, a control frame from the AP MLD soliciting a response on the first communication link;

performing a timing measurement operation that indicates a delay between the second time and the start of the r-TWT SP; and refraining from responding to the control frame responsive to the timing measurement operation indicating that the delay is less than a threshold duration.

10. The method of any of clauses 1-7, where the communicating with the AP MLD on the first communication link includes:

receiving, at a second time, a control frame from the AP MLD soliciting a response on the first communication link;

performing a timing measurement operation that indicates a delay between the second time and the start of the r-TWT SP; and transmitting, to the AP MLD, information indicating that the wireless communication device is available on the first communication link only between the second time and the first time responsive to the timing measurement operation indicating that the delay is greater than or equal to a threshold duration.

11. The method of any of clauses 1-10, where the terminating of the communication on the first communication link includes:

transmitting, on the first communication link, power management information indicating that a STA associated with the first communication link is entering a power save mode.

12. The method of any of clauses 1-11, where the power management information is carried in a medium access control (MAC) protocol data unit (MPDU) transmitted to the AP MLD during the TXOP.

13. The method of any of clauses 1-11, where the power management information is carried in a control frame transmitted to the AP MLD responsive to one or more MPDUs received on the first communication link during the TXOP.

14. A wireless communication device, including:

a processing system; and an interface configured to:

establish a plurality of communication links with an access point (AP) multi-link device (MLD);

communicate with the AP MLD on a first communication link of the plurality of communication links, the communication being associated with a transmit opportunity (TXOP);

terminate the communication on the first communication link at a first time associated with a restricted target wake time (r-TWT) service period (SP) associated with a second communication link of the plurality of communication links; and exchange data with the AP MLD during a period associated with the r-TWT SP.

15. The wireless communication device of clause 14, where the terminating of the communication on the first communication link includes:

transmitting, on the first communication link, power management information indicating that a wireless station (STA) associated with the first communication link is entering a power save mode.

16. A method performed by a wireless communication device, including:

establishing a plurality of communication links with a non-access point (non-AP) multi-link device (MLD);

transmitting first target wake time (TWT) information indicating a first TWT service period (SP) associated with a first communication link of the plurality of communication links; and transmitting second TWT information indicating a second TWT SP associated with a second communication link of the plurality of communication links.

17. The method of clause 16, where the first TWT SP and the second TWT SP are orthogonal in time.

18. The method of any of clauses 16 or 17, where the non-AP MLD operates in an enhanced multi-link single radio (EMLSR) mode or an enhanced multi-link multi-radio (EMLMR) mode of non-AP MLD operation, the method further including:
exchanging data packets with the non-AP MLD on the first communication link during the first TWT SP without transmitting an initial packet on the first communication link between the start of the first TWT SP and the start of the exchange, the initial packet being different than the data packets.
19. The method of clause 16, where the first TWT SP at least partially overlaps the second TWT SP in time.
20. The method of any of clauses 16 or 19, further including:
performing a channel comparison operation that indicates which of the first communication link or the second communication link is associated with superior channel conditions; and
transmitting, on the first communication link, a control frame soliciting a response from the non-AP MLD during the first TWT SP responsive to the channel comparison operation indicating that the first communication link is associated with superior channel conditions.
21. The method of any of clauses 16, 19 or 20, where the control frame is a trigger frame.
22. The method of any of clauses 16 or 19, further including:
transmitting, on the first communication link, a first control frame soliciting a first response from the non-AP MLD during the first TWT SP; and
transmitting, on the second communication link, a second control frame soliciting a second response from the non-AP MLD during the second TWT SP.
23. The method of any of clauses 16, 19, or 22, where the first control frame and the second control frame are transmitted concurrently.
24. The method of any of clauses 16, 19, 22, or 23, where the first control frame is transmitted within a point coordination function (PCF) interframe space (PIFS) duration following the start of the first TWT SP and the second control frame is transmitted within a PIFS duration following the start of the second TWT SP.
25. The method of any of clauses 16, 19 or 22-24, further including:
receiving, on the first communication link, a response to the first control frame indicating that the first communication link is associated with superior channel conditions compared to the second communication link; and
communicating with the non-AP MLD exclusively on the first communication link during the first TWT SP and the second TWT SP.
26. The method of any of clauses 16 or 19, further including: transmitting a first PPDU on the first communication link during the first TWT SP; and
transmitting a second PPDU on the second communication link during the second TWT SP, the first and second PPDUs being transmitted concurrently.
27. The method of any of clauses 16, 19, or 26, where the first PPDU is transmitted within a PIFS duration following the start of the first TWT SP and the second PPDU is transmitted within a PIFS duration following the start of the second TWT SP.
28. The method of clause 16, where the second TWT information is associated with a transfer of a TWT agreement from the first communication link to the second communication link.
29. A wireless communication device, including:
a processing system; and
an interface configured to:
establish a plurality of communication links with a non-access point (non-AP) multi-link device (MLD);
transmit first target wake time (TWT) information indicating a first TWT service period (SP) associated with a first communication link of the plurality of communication links; and
transmit second TWT information indicating a second TWT SP associated with a second communication link of the plurality of communication links.
30. The wireless communication device of clause 29, where the second TWT information indicates a transfer of a TWT agreement associated with the first TWT SP from the first communication link to the second communication link.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described herein as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example pro-

What is claimed is:

1. A method performed by a wireless communication device, comprising:
   establishing a plurality of communication links with an access point (AP) multi-link device (MLD);
   communicating with the AP MLD on a first communication link of the plurality of communication links, the communication being associated with a transmit opportunity (TXOP);
   terminating the communication on the first communication link at a first time associated with a service period associated with a second communication link of the plurality of communication links, wherein the first time precedes a start of the service period by a duration greater than or equal to a transition delay associated with transitioning operations from the first communication link to the second communication link; and
   exchanging, on the second communication link, data with the AP MLD during a period associated with the service period.

2. The method of claim 1, wherein the transition delay is associated with transitioning a wireless radio from operating on the first communication link to operating on the second communication link in accordance with a multi-link single-radio (MLSR) mode of non-AP MLD operation, the transition delay including a delay associated with transmitting power management information indicating that a wireless station (STA) operating on the first communication link is entering a power save mode.

3. The method of claim 1, wherein the transition delay is associated with transitioning a wireless radio from a transmitting or receiving state to a listening state in accordance with an enhanced multi-link single-radio (EMLSR) mode of non-AP MLD operation.

4. The method of claim 1, wherein the transition delay is associated with switching one or more antennas from operating on the first communication link to operating on the second communication link in accordance with an enhanced multi-link multi-radio (EMLMR) mode of non-AP MLD operation.

5. The method of claim 1, wherein the communicating with the AP MLD on the first communication link comprises:
   receiving a control frame from the AP MLD soliciting a response on the first communication link;
   performing a channel comparison operation that indicates which of the first communication link or the second communication link is associated with superior channel conditions; and
   refraining from responding to the control frame responsive to the channel comparison operation indicating that the second communication link is associated with the superior channel conditions.

6. The method of claim 1, wherein the communicating with the AP MLD on the first communication link comprises:
   receiving, at a second time, a control frame from the AP MLD soliciting a response on the first communication link;
   performing a timing measurement operation that indicates a delay between the second time and the start of the service period; and
   refraining from responding to the control frame responsive to the timing measurement operation indicating that the delay is less than a threshold duration.

7. The method of claim 1, wherein the communicating with the AP MLD on the first communication link comprises:
   receiving, at a second time, a control frame from the AP MLD soliciting a response on the first communication link;
   performing a timing measurement operation that indicates a delay between the second time and the start of the service period; and
   transmitting, to the AP MLD, information indicating that the wireless communication device is available on the first communication link only between the second time and the first time responsive to the timing measurement operation indicating that the delay is greater than or equal to a threshold duration.

8. The method of claim 1, wherein the terminating of the communication on the first communication link comprises:
   transmitting, on the first communication link, power management information indicating that a STA associated with the first communication link is entering a power save mode.

9. The method of claim 8, wherein the power management information is carried in a medium access control (MAC) protocol data unit (MPDU) transmitted to the AP MLD during the TXOP.

10. The method of claim 8, wherein the power management information is carried in a control frame transmitted to the AP MLD responsive to one or more MPDUs received on the first communication link during the TXOP.

11. The method of claim 1, wherein the service period is a restricted target wake time (r-TWT) service period.

12. A wireless communication device, comprising:
    one or more memories storing processor-executable code; and
    one or more processors coupled with the one or more memories and individually or collectively operable to execute the code to cause the wireless communication device to:
      establish a plurality of communication links with an access point (AP) multi-link device (MLD);
      communicate with the AP MLD on a first communication link of the plurality of communication links, the communication being associated with a transmit opportunity (TXOP);
      terminate the communication on the first communication link at a first time associated with a service period associated with a second communication link of the plurality of communication links, wherein the first time precedes a start of the service period by a duration greater than or equal to a transition delay associated with transitioning operations from the first communication link to the second communication link; and exchange, on the second communication link, data with the AP MLD during a period associated with the service period.

13. The wireless communication device of claim 12, wherein to terminate the communication on the first communication link the one or more processors are individually or collectively operable to execute the code to cause the wireless communication device to:
transmit, on the first communication link, power management information indicating that a wireless station (STA) associated with the first communication link is entering a power save mode.

14. The wireless communication device of claim 12, wherein the transition delay is associated with transitioning a wireless radio from operating on the first communication link to operating on the second communication link in accordance with a multi-link single-radio (MLSR) mode of non-AP MLD operation.

15. The wireless communication device of claim 12, wherein the transition delay is associated with transitioning a wireless radio from a transmitting or receiving state to a listening state in accordance with an enhanced multi-link single-radio (EMLSR) mode of non-AP MLD operation.

16. The wireless communication device of claim 12, wherein the transition delay is associated with switching one or more antennas from operating on the first communication link to operating on the second communication link in accordance with an enhanced multi-link multi-radio (EMLMR) mode of non-AP MLD operation.

17. The wireless communication device of claim 12, wherein the transition delay is zero in accordance with a non-simultaneous transmit/receive (NSTR) mode of non-AP MLD operation.

18. The wireless communication device of claim 12, wherein the service period is a target wake time (TWT) service period.

19. The wireless communication device of claim 12, wherein the service period is a restricted target wake time (r-TWT) service period.

20. A method performed by a wireless communication device, comprising:
establishing a plurality of communication links with a non-access point (non-AP) multi-link device (MLD);
transmitting first target wake time (TWT) information indicating a first TWT service period (SP) associated with a first communication link of the plurality of communication links;
transmitting second TWT information indicating a second TWT SP associated with a second communication link of the plurality of communication links, wherein the second TWT information is associated with a transfer of a TWT agreement from the first communication link to the second communication link, and wherein the first TWT SP at least partially overlaps the second TWT SP in time;
performing a channel comparison operation that indicates which of the first communication link or the second communication link is associated with superior channel conditions; and
transmitting, on the first communication link, a control frame soliciting a response from the non-AP MLD during the first TWT SP responsive to the channel comparison operation indicating that the first communication link is associated with the superior channel conditions.

21. The method of claim 20, wherein the first TWT SP and the second TWT SP are orthogonal in time.

22. The method of claim 21, wherein the non-AP MLD operates in an enhanced multi-link single radio (EMLSR) mode or an enhanced multi-link multi-radio (EMLMR) mode of non-AP MLD operation, the method further comprising:
exchanging data packets with the non-AP MLD on the first communication link during the first TWT SP without transmitting an initial packet on the first communication link between a start of the first TWT SP and a start of the exchange, the initial packet being different than the data packets.

23. The method of claim 20, wherein the control frame is a trigger frame.

24. The method of claim 20, further comprising:
transmitting, on the first communication link, a first control frame soliciting a first response from the non-AP MLD during the first TWT SP; and
transmitting, on the second communication link, a second control frame soliciting a second response from the non-AP MLD during the second TWT SP.

25. The method of claim 24, wherein the first control frame and the second control frame are transmitted concurrently.

26. The method of claim 24, wherein the first control frame is transmitted within a point coordination function (PCF) interframe space (PIFS) duration following a start of the first TWT SP and the second control frame is transmitted within a PIFS duration following a start of the second TWT SP.

27. The method of claim 24, further comprising:
receiving, on the first communication link, a response to the first control frame indicating that the first communication link is associated with superior channel conditions compared to the second communication link; and
communicating with the non-AP MLD exclusively on the first communication link during the first TWT SP and the second TWT SP.

28. The method of claim 20, further comprising:
transmitting a first PPDU on the first communication link during the first TWT SP; and
transmitting a second PPDU on the second communication link during the second TWT SP, the first and second PPDUs being transmitted concurrently.

29. The method of claim 28, wherein the first PPDU is transmitted within a PIFS duration following a start of the first TWT SP and the second PPDU is transmitted within a PIFS duration following a start of the second TWT SP.

30. A wireless communication device for wireless communication, comprising:
one or more memories storing processor-executable code; and
one or more processors coupled with the one or more memories and individually or collectively operable to execute the code to cause the wireless communication device to:
establish a plurality of communication links with a non-access point (non-AP) multi-link device (MLD);
transmit first target wake time (TWT) information indicating a first TWT service period (SP) associated with a first communication link of the plurality of communication links;
transmit second TWT information indicating a second TWT SP associated with a second communication link of the plurality of communication links, wherein the second TWT information indicates a transfer of a TWT agreement associated with the first TWT SP from the first communication link to the second communication link, and wherein the first TWT SP at least partially overlaps the second TWT SP in time;

perform a channel comparison operation that indicates which of the first communication link or the second communication link is associated with superior channel conditions; and transmit, on the first communication link, a control frame soliciting a response from the non-AP MLD during the first TWT SP responsive to the channel comparison operation indicating that the first communication link is associated with the superior channel conditions.

\* \* \* \* \*